United States Patent
Mladin et al.

(10) Patent No.: US 12,095,872 B2
(45) Date of Patent: Sep. 17, 2024

(54) FRAMEWORK FOR DYNAMIC BROKERAGE AND MANAGEMENT OF TOPICS AND DATA AT THE SERVICE LAYER

(71) Applicant: CONVIDA WIRELESS, LLC, Wilmington, DE (US)

(72) Inventors: Catalina Mihaela Mladin, Hatboro, PA (US); Dale N. Seed, Allentown, PA (US); Quang Ly, North Wales, PA (US); Zhuo Chen, Claymont, DE (US); William Robert Flynn, IV, Schwenksville, PA (US); Jiwan L. Ninglekhu, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 17/297,535

(22) PCT Filed: Nov. 26, 2019

(86) PCT No.: PCT/US2019/063279
§ 371 (c)(1),
(2) Date: May 27, 2021

(87) PCT Pub. No.: WO2020/112793
PCT Pub. Date: Jun. 4, 2020

(65) Prior Publication Data
US 2022/0014594 A1 Jan. 13, 2022

Related U.S. Application Data

(60) Provisional application No. 62/772,493, filed on Nov. 28, 2018.

(51) Int. Cl.
*H04L 67/51* (2022.01)
*H04L 43/10* (2022.01)
(Continued)

(52) U.S. Cl.
CPC .............. *H04L 67/51* (2022.05); *H04L 43/10* (2013.01); *H04L 67/12* (2013.01); *H04L 67/55* (2022.05); *H04W 4/23* (2018.02); *H04W 4/60* (2018.02)

(58) Field of Classification Search
CPC ......... H04L 67/16; H04L 67/12; H04L 67/26; H04L 43/10; H04W 4/23; H04W 4/60
(Continued)

(56) References Cited

U.S. PATENT DOCUMENTS

2007/0180077 A1* 8/2007 Letca .................. H04L 43/0817
709/224
2008/0229334 A1* 9/2008 Graham .................. G06F 9/546
719/318
(Continued)

FOREIGN PATENT DOCUMENTS

CN 101848236 A 9/2010
WO WO-2016187515 A1 * 11/2016 ......... H04L 67/2833
WO 2018/112327 A1 6/2018

OTHER PUBLICATIONS

Baldoni, Dynamic Message Ordering for Topic-Based Publish/Subscribe Systems, Aug. 16, 2012, IEEE, https://ieeexplore.ieee.org/document/6267898?source=IQplus (Year: 2012).*
(Continued)

*Primary Examiner* — Zi Ye
(74) *Attorney, Agent, or Firm* — BakerHostetler

(57) ABSTRACT

Methods and apparatuses are described herein for a framework for data brokerage services in a service layer. A first apparatus may receive, from a second apparatus, a first signal comprising first information indicating a publishing intent associated with atopic indicator. The first apparatus may receive, from a third apparatus, a second signal comprising second information indicating a subscription intent associated with the topic indicator. The first apparatus may
(Continued)

generate, based on the publishing intent and the subscription request, a topic instance. The first apparatus may send a third signal comprising an announcement message indicating the generated topic instance. The first apparatus may receive, from the third apparatus, a fourth signal comprising a subscription request for the generated topic instance. The first apparatus may send, to the third apparatus, at least one fifth signal comprising notifications and publish instances associated with the generated topic instance.

18 Claims, 25 Drawing Sheets

(51) Int. Cl.
  *H04L 67/12* (2022.01)
  *H04L 67/55* (2022.01)
  *H04W 4/23* (2018.01)
  *H04W 4/60* (2018.01)

(58) Field of Classification Search
  USPC .......................................................... 709/206
  See application file for complete search history.

(56) References Cited

U.S. PATENT DOCUMENTS

| | | | | |
|---|---|---|---|---|
| 2014/0244768 | A1* | 8/2014 | Shuman | H04W 4/70 709/206 |
| 2015/0081443 | A1* | 3/2015 | Davis | G06Q 30/0251 705/14.58 |
| 2018/0183862 | A1 | 6/2018 | Huh et al. | |
| 2020/0288291 | A1* | 9/2020 | Wang | H04W 4/50 |

OTHER PUBLICATIONS

Koster Smartthings A Keranen J Jimenez Ericsson M: "Publish-Subscribe Bro ker for the Constrained Application Protocol (CoAP); draft-ietf-core-coap-pubsub-00.txt", Draft-ietf-core-coap-pubsub-00.txt, Internet engineering task force, ietf; Standardworkingdraft, internet society (ISoc) 4, rue des falaises ch- 1205 Geneva, switzerland, Oct. 21, 2016, pp. 1-22.

* cited by examiner

FRAMEWORK FOR DYNAMIC BROKERAGE AND MANAGEMENT OF TOPICS AND DATA AT THE SERVICE LAYER

CROSS-REFERENCE TO RELATED APPLICATIONS

This application is the National Stage of International Patent Application No. PCT/US2019/063279, filed Nov. 26, 2019, which claims the benefit of U.S. Provisional Patent Application No. 62/772,493, filed Nov. 28, 2018, which are hereby incorporated by reference in their entirety.

BACKGROUND

Data is organized based on data producer settings and configurations, and not on consumer usage or meaning. There are many cases in which the meaning and usage of data are common to multiple consumers. However, there are no ways for consumers to propose ways of organizing the information based on interest (or the way data is consumed) which then can be used by other consumers and for which a service layer platform can then provide data management.

Data meaning, conveyed via labels and/or semantic description, may be assigned generally by producers or other entities, and generally resides with the individual resources, therefore common meaning is distributed. Accordingly, there is a need for improved data brokerage services in a service layer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for a framework for data brokerage services in a service layer. In accordance with one embodiment, a first apparatus may receive, from a second apparatus, a first signal comprising first information indicating a publishing intent associated with a topic indicator. The first apparatus may receive, from a third apparatus, a second signal comprising second information indicating a subscription intent associated with the topic indicator. The first apparatus may generate, based on the publishing intent and the subscription request, a topic instance. The first apparatus may send a third signal comprising an announcement message indicating the generated topic instance. The first apparatus may receive, from the third apparatus, a fourth signal comprising a subscription request for the generated topic instance. The first apparatus may send, to the third apparatus, at least one fifth signal comprising notifications and publish instances associated with the generated topic instance.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Figure 1:
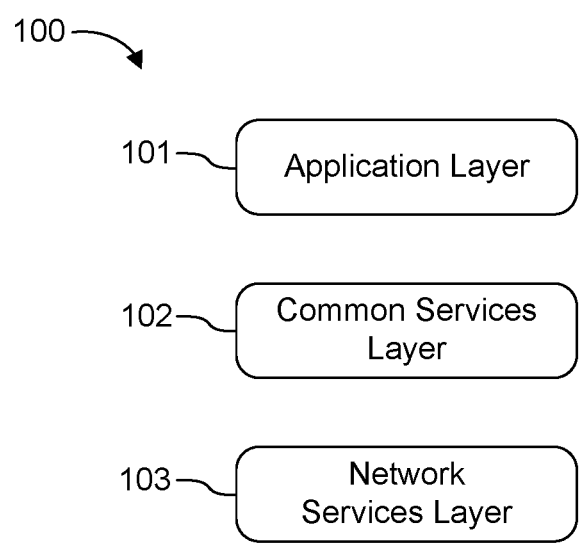
FIG. 1 is a diagram of a oneM2M Layered Model depicting the oneM2M service layer.

Methods and apparatuses are described herein for a framework for data brokerage services in a service layer. The framework described herein may provide topic-based data management, with the goal of making the data easier to discover, consume, and advertise. A service layer platform may use topic-based data brokerage to organize and expose data in ways consistent with how the data is consumed and embedding the data meaning to consumers. The framework described herein may provide an overlay of topic-based Pub/Sub brokerage to a RESTful service layer, using existing service layer mechanisms as triggers to automatically produce topics and topic instances, determine publish or subscribe intent, determine advertisement interest, etc.

Data producers may store data at the service layer directly as regular resources or as announced resources (synchronized). Data consumers may discover data via discovery/query. To consume updated data, consumers may subscribe to individual resources. When more than one resource provides the same information, each resource may need to be discovered and subscribed- to individually. Consumers may also repeat discovery/query requests. This may be useful also for discovering new resources that provide the same information. Data may be assigned meaning that is conveyed via labels and/or semantic description. Meaning may also be assigned generally by producers, reflective of intended meaning. Meaning may also be assigned other entities, however this may be done differently by different entities, and the meaning generally resides with the individual resources.

The methods and apparatuses described herein are directed to a service layer service that publishes data in ways that adapt dynamically to discovery/query or subscription requests, to newly announced data, etc. The service may organize data in topics of interest and may allow data producers and consumers to be loosely coupled and operating independently. Advertisement services including determination of interest and advertisement scope from service layer actions and information are described herein. Value-add services providing constrained Internet of Things (IoT) devices with data storage, pre-processing, and security. Services for expanding discovery scope with Topic information and re-directing it to system participants are described herein. Providing arbitration of publication and notification messages based on the strength of the Participants and maintaining the status of the liveliness of the participants are also described.

The following is a list of abbreviations of terms as used herein:
AE Application Entity
ACP Access Control Policy
CSE Common Service Entity
CSF Common Service Function
IoT Internet of Things
M2M Machine-to-Machine
RDF Resource Description Framework
URI Uniform Resource Identifier The following is a list of definitions of terms as used herein:

Common Service Entity (CSE): oneM2M term for an instantiation of a set of Common Service Functions.

Hosting Node: an M2M Service node which hosts various resources. The hosted resources can be accessed and subscribed by other M2M entities.

M2M Entities: any node that participates in M2M communications, in both field and infrastructure domains.

M2M Service Node: a network node hosting a service layer supporting one or more service capabilities for M2M communication.

Originator: the entity that initiates of a Request message for a RESTful operation. For example, the CSE where an Originator is trying to perform a resource discovery via RETRIEVE.

Service layer: a software middleware layer that sits between M2M applications and communication HW/SW that provides data transport. It provides commonly needed functions for M2M applications across different industry segments.

Receiver: the entity that receives a Request message with a RESTful operation, it processes it and sends a corresponding Response message.

FIG. 1 is a diagram of a oneM2M Layered Model 100 depicting the oneM2M service layer. M2M solutions enabling machines/devices to communicate with each other have been developed for the healthcare sector, the energy sector, and the automotive sector. The next step of optimization is to provide solutions integrating machines and things from different sectors on the same platforms. For this purpose, a single set of standards defining a horizontal platform for the exchange and the sharing of data among applications, independent of industry sectors, has been initiated by oneM2M. oneM2M provides a framework for interworking with different technologies by creating a distributed software layer, similarly to an operating system. This distributed software layer is implemented in a common service layer 102 that sits between the M2M applications (e.g., the application layer 101) and the communication HW/SW that provides data transport (e.g., the network services layer 103).

Figure 2:
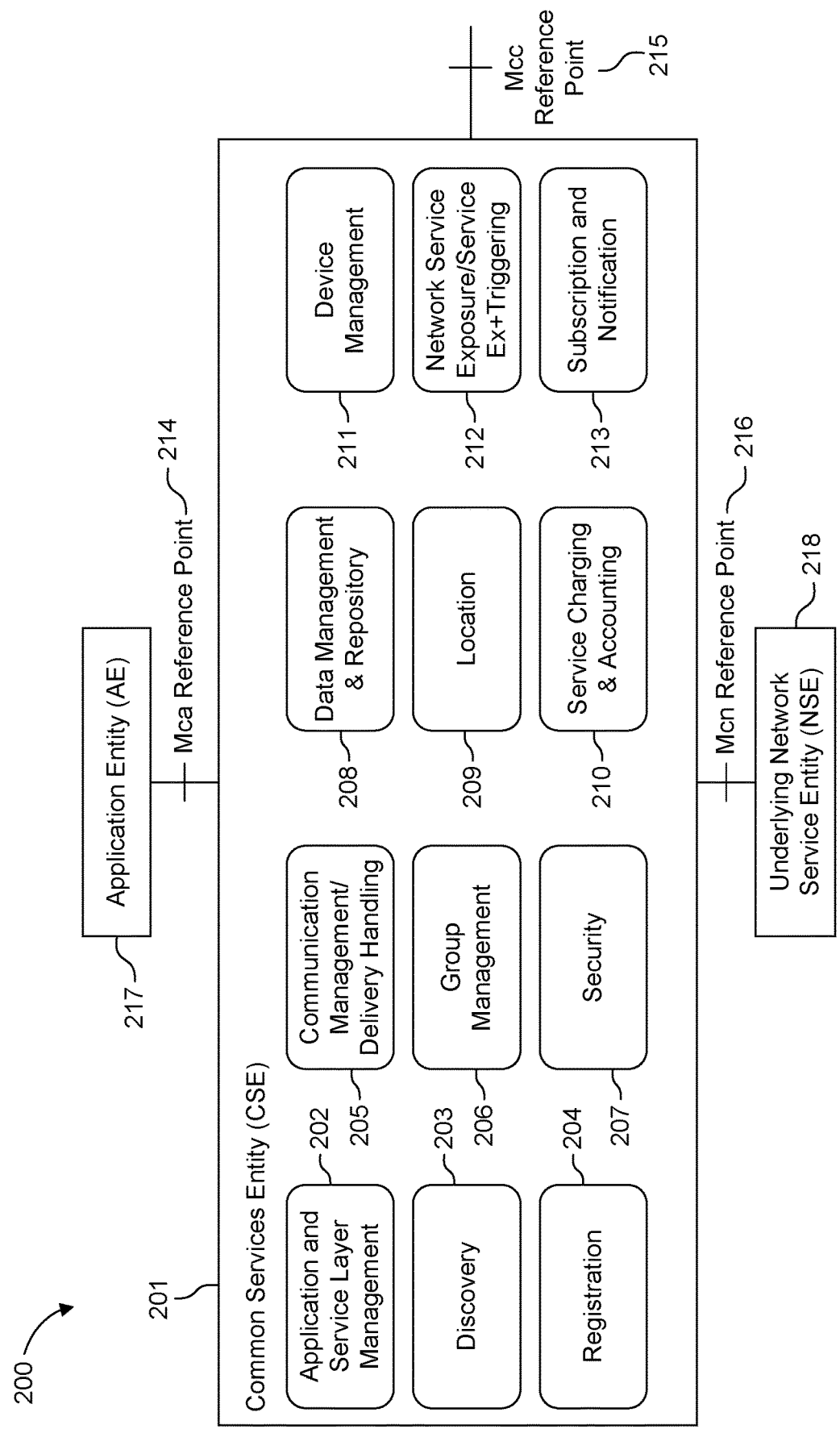
FIG. 2 is a diagram of an example oneM2M service layer that supports an initial set of common service functions (CSF)

FIG. 2 is a diagram of an example oneM2M service layer that supports an initial set of common service functions (CSF) 200. The service layer is enabled functionally by CSFs. A group of CSFs may be instantiated as a group on Common Services Entities (CSEs) 201 as shown in FIG. 2. Examples of CSFs and their functionality may include the following:

Application and service layer Management CSF 202: may provide management of AEs and CSEs.

Discovery CSF 203: may search for information about applications and services based on some filter criteria.

Registration CSF 204: may provide the functionality for AEs (or other remote CSEs) to register with a CSE. This may allow the AEs (or the remote CSE) to use the services of the CSE.

Communication Management/Delivery Handling CSF 205: may provide communications with other CSEs, AEs and NSEs. This CSF may decide at what time and which communication connection for delivering communications and if necessary and allowed, to buffer communications request so that they may be forwarded at a later time.

Group Management CSF 206: may provide for the handling of group related requests and enables an M2M system to support bulk operations for example, on multiple devices, applications, etc.

Security CSF 207: may provide security functions for the service layer, such as access control including identification, authentication, and authorization.

Data Management and Repository CSF 208: may provide data storage and mediation functions (for example, collecting data for aggregation, re-formatting data, and storing data for analytics and semantic processing).

Location CSF 209: may provide the functionality to enable AEs to obtain geographical location information.

Service Charging & Accounting CSF 210: may provide charging functions for the service layer Device Management CSF 211: may provide management of device capabilities on M2M gateways and M2M devices.

Network Service Exposure, Service Execution and Triggering CSF 212: may manage communications with the Underlying Networks for accessing network service functions.

Subscription and Notification CSF 213: may provide functionality to allow for subscribing to an event and to be notified when this event occurs.

The oneM2M architecture may provide for a CSE 201 to interface through the Mca reference point 214, Mcc (and Mcc') reference point 215, and Mcn reference point 216 to other entities including but not limited to: an Application Entities (AE) 217; other CSEs; and a Network Service Entity (NSE) 218 (i.e. the underlying network).

Figure 3:
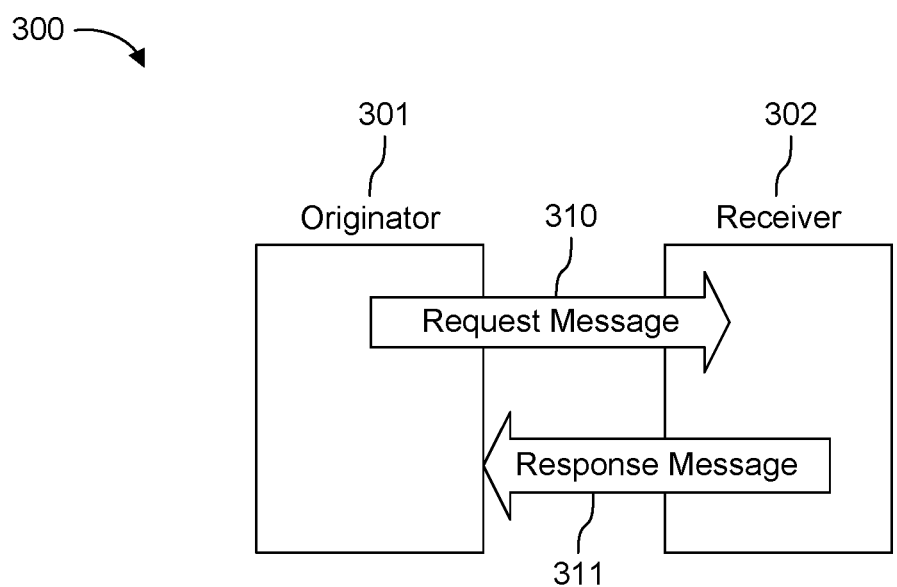
FIG. 3 is a diagram of an example procedure for message exchanges and operations.

FIG. 3 is a diagram of an example procedure for message exchanges and operations 300. The example procedure of FIG. 3, may govern the information exchange in oneM2M and may be based on the use of Request and Response messages. In an example, an originator 301 may send a request message 310 to a receiver 302. The receiver 302 may send a response message 311 to the originator 301. The procedure 300 may apply to communications between AEs and a CSE (over the Mca reference point) as well as among CSEs (over the Mcc reference point). Depending on the operation carried by the messages, these procedures may manipulate information in standardized resource representations via RESTful methods such as CREATE, RETRIEVE, UPDATE, and DELETE. Both the request and response messages may be specified, and contain mandatory, optional or conditional parameters. Table 1 below provides a list of request parameters with descriptions.

TABLE 1

Request Parameter List

| Request Parameter | Criticality | Description |
| --- | --- | --- |
| To | Mandatory | Address of the target resource or target attribute for the operation |
| From | Mandatory | Identifier representing the Originator |
| Operation | Mandatory | Operation to be executed: Create (C), Retrieve (R), Update (U), Delete (D), Notify (N). |
| Request Identifier | Mandatory | ID enabling tracking of Requests and corresponding Responses |
| Content | Conditional based on Operation: Mandatory for C, U, N Optional for R | (C) content of the new resource to be created (U) content to be replaced in an existing resource (N) notification information Optional for: (R) list of attributes to be retrieved |
| Resource type | Conditional, Mandatory only for C | Resource type for the resource to be created. |
| Role | Optional | Originator role to be used in role based access control |
| Originating Timestamp | Optional | Originating timestamp of when the message was built. |
| Request Expiration Timestamp | Optional | Indicates when the request messages (including delay-tolerant) should expire |
| Response Expiration Timestamp | Optional | Indicates when the response messages (including delay-tolerant) should expire |
| Response type | Optional | Indicates what type of response shall be used. Options are: nonBlockingRequestSynch, nonBlockingRequestAsynch, blockingRequest |
| Result Content | Optional | Indicates what the expected components of the result are. Options are: attributes, hierarchical-address, hierarchical-address + attributes, attributes + child-resources, child-resources, attributes + child-resource-references, child-resource-references, nothing, original-resource |
| Result Persistence | Optional | Indicates the duration for which the address containing the responses is to persist. |
| Operation Execution Time | Optional | Indicates the time when the specified operation is to be executed by the target CSE |
| Event Category | Optional | Indicates the event category that should be used to handle this request in transit, such as: immediate, bestEffort, latest |
| Delivery Aggregation | Optional | Enables aggregation of one or more request for delivery to the same CSE(s), depending on policies |
| Group Request Identifier | Optional | Identifier optionally added to group requests that is to be fanned out, in order to detect loops and avoid duplicated operations. |
| Filter Criteria | Optional | Conditions for filtered retrieve operation are described in the next section It is used for resource discovery and general retrieve, update, delete requests. |
| Discovery Result Type | Optional | Indicates the preference of the Originator for the format of returned information in the result of the operation. Options are: Hierarchical addressing, non-Hierarchical addressing |

Some of the request parameters above may be used in discovery operations as described herein.

Table 2 below provides a list of response parameters with descriptions.

The content of the search result may depend on some of the Filter Criteria by matching certain search parameters (e.g. based on resource type, resource creation time, resource size, etc.). Other Filter Criteria parameters (e.g.

TABLE 2

Response Parameter List

| Response message parameter/ success or not | Response Code = Ack | Response Code = successful: Operation = Create | Response Code = successful: Operation = Retrieve | Response Code = successful. Operation = Update | Response Code = successful. Operation = Delete | Response Code = successful Operation = Notify | Response Code = unsuccessful Operation = C, R, U, D or N |
|---|---|---|---|---|---|---|---|
| Response Code - successful, unsuccessful, ack | M | M | M | M | M | M | M |
| Request Identifier - uniquely identifies a Request message | M | M | M | M | M | M | M |
| Content - to be transferred | O (address of <request> resource for a non-blocking request) | O (The address and/or the content of the created resource) | M (the retrieved resource content or aggregated contents of discovered resources) | O (The modified attributes, either updated, deleted or new) | O (The content actually deleted) | N/A | O (Additional error info) |
| To - the identifier of the Originator or the Transit CSE (non-blocking request) | O | O | O | O | O | O | O |
| From - the identifier of the Receiver | O | O | O | O | O | O | O |
| Originating Timestamp - when the message was built | O | O | O | O | O | O | O |
| Result Expiration Timestamp - when the message expires | O | O | O | O | O | N/A | O |
| Event Category - what event category shall be used for the response message | O | O | O | O | O | O | O |
| Status Code - (e.g. authorization timeout, etc.) | O | O | O | O | O | O | O |

Resource discovery is a process by which an entity (e.g., the Originator of FIG. 3) may search for information about applications and services contained in attributes and resources. In oneM2M the Originator of a resource discovery may be either an AE or a CSE and may target a root resource at a Receiver CSE where the search is to start. limit), along with some operation parameters (e.g. Discovery Result Type) may play a role in the way the content of the search result is provided back to the Originator. The discovery operation, like the CRUD ones, is subject to the access control policy at the Receiver CSE, i.e., does the Originator have "DISCOVER" access rights.

The list of search parameters provided in Table 3 distinguishes between filter criteria provided for matching and those with other roles, such as specifying the type of criteria usage, or the way the results are returned. These parameters may be combined by relational operations to create compound search criteria.

TABLE 3

Resource Discovery Filter Criteria

| Search Parameter | Resource matching if: |
| --- | --- |
| createdBefore | It was created before createdBefore |
| createdAfter | It was created after createdAfter |
| modifiedSince | It has been modified since modifiedSince |
| unmodifiedSince | It has not been modified since unmodifiedSince |
| stateTagSmaller | It has stateTag attribute smaller than stateTagSmaller |
| stateTagBigger | It has stateTag attribute larger than stateTagBigger |
| expireBefore | It has expirationTime attribute before expireBefore |
| expireAfter | It has expirationTime attribute after expireAfter |
| labels | It has labels attribute matching labels search parameter. The labels are tokens used as keys for discovery purposes |
| resourceType | It is of type resourceType |
| sizeAbove | The contentSize attribute of the <contentInstance> resource is equal to or greater than the sizeAbove value |
| sizeBelow | The contentSize attribute of the <contentInstance> resource is smaller than the sizeBelow value |
| contentType | The contentInfo attribute of the <contentInstance> resource matches the contentType value |
| attribute | It has the corresponding matching resource attribute |

| Filter criteria (others) | Role: |
| --- | --- |
| limit | This parameter is not used as search criterion, rather as in formatting/limiting the way the search result is returned |
| filterUsage | This parameter is not used as search criterion, rather for indicating the use of the filter criteria for discovery purposes |

In oneM2M resource discovery may be implemented using a RETRIEVE method, using filterUsage to indicate to the Receiver CSE to distinguish between a resource discovery operation and a generic retrieve operation.

Figure 4:
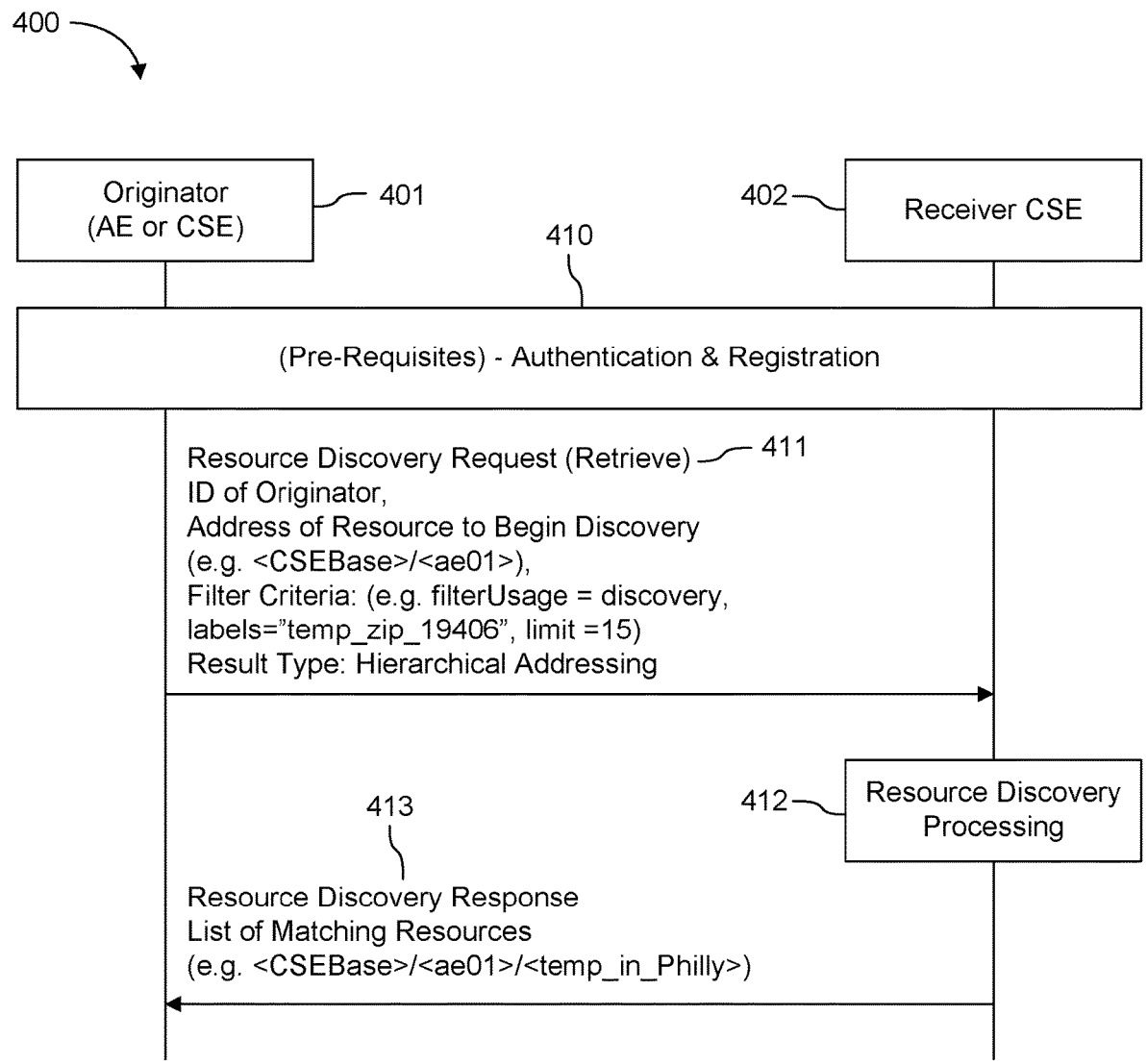
FIG. 4 is a diagram of an example procedure for generic resource discovery.

FIG. 4 is a diagram of an example procedure for generic resource discovery 400. An originator (AE of CSE) 401 and a receiver CSE 402 may be authenticated and registered (step 410). The originator 401 may issue a resource discovery request to the receiver CSE 402, targeting specific child resources of resource <CSEBase>/<ae01> (step 411). The receiver CSE 402 may process the request and may return the appropriate list of discovered resources (step 412). The receiver CSE 402 may limit the discovery result according to the DISCOVER privileges of the discovered resources and may change the filter criteria according to its own local policy. If the full list of discovered resources cannot be returned, the receiver CSE 402 may warn the originator 401 (e.g., with a flag). The receiver CSE 402 may send a resource discovery response (step 413), which may include a list of addresses of the resources that match the Filter Criteria. It may be the responsibility of the originator 401, if needed, to retrieve the resources pointed to by the addresses.

Service layer authorization mechanisms may be used to control access to resources and/or services hosted in the service layer. Authorization may involve allowing authenticated registrants to access resources and services hosted in a service layer based on statically provisioned authorization policies and assigned roles. An authorization policy may comprise a set of rules that define whether a given service layer registrant is permitted to access a protected resource or service hosted in the service layer.

A service layer access control policy (ACP) may define which service layer registrants are permitted to access which resources and services, as well as which operations they may be allowed to perform on a given resource or service. In the embodiments described herein, the authorization functionality associated with service layer authorizations is preceded by authentication.

oneM2M defines the <accessControlPolicy> resources to support authorization. The <accessControlPolicy> resource comprises privileges and selfPrivileges attributes that represent a set of access control rules defining which entities (defined by accessControlOriginators) have the privilege to perform certain operations (defined by accessContolOperations) within specified contexts (defined by accessControlContexts) and are used by CSEs to make Access Decision for specific resources.

Once configured these privileges are typically static from the perspective of the service layer. The service layer does not dynamically create, update, or delete privileges on-the-fly.

For a particular privileges attribute, an access control rule defines which AE/CSE is allowed for which operation, so for sets of access control rules an operation is permitted if it is permitted by one or more access control rules in the set. For a resource that is not of <accessControlPolicy> resource type, the common attribute accessControlPolicyIDs for such resources contains a list of identifiers which link that resource to <accessControlPolicy> resources.

The selfPrivileges attribute represents the set of access control rules for the <accessControlPolicy> resource itself.

The set of Access Control Rules represented in privileges and selfPrivileges attributes are comprised of 3-tuples described below:

accessControlOriginators: a set of service layer registrants authorized to access resources associated with this authorization policy (e.g. list of CSE-IDs or AE-IDs);

accessControlContext: oneM2M defines the following three types of authorization context: accessControlTimeWindows (time window during which requests are allowed); accessControlLocationRegions (locations where registrants are allowed to be located when accessing resources); accessControlIpAddresses (IP addresses of registrants allowed to access resources);

accessControlOperations: the set of operations that each authorized service layer registrant is authorized to perform. oneM2M defines the following operations: RETRIEVE, CREATE, UPDATE, DELETE, DISCOVER, NOTIFY.

accessControlPolicyIDs is a common attribute of many oneM2M resources. This attribute contains a list of identifiers of an <accessControlPolicy> resource. The privileges attribute defined in the <accessControlPolicy> resource that are referenced determines who is allowed to access the resource containing this attribute for a specific purpose (e.g. Retrieve, Update, Delete, etc.). oneM2M defines specific rules to be applied, e.g. if a resource type does not have an accessControlPolicyIDs attribute definition, if a resource type does have an accessControlPolicyIDs attribute definition but the accessControlPolicyIDs attribute is not set, etc.

Publish—subscribe (Pub/Sub) software systems may use a data distribution model where the data is not sent directly to specific receivers, as in Point-to-Point or Client-Server models. Instead, the entities generating the information (termed producers) publish the data using classes or categories (termed topics). Similarly, entities expressing interest in one or more topics (subscribers) receive only messages of interest, without direct interaction with and possibly without knowledge of the publishers.

A message topic may provide a lightweight mechanism to broadcast asynchronous event notifications and may enable software components to connect to a topic in order to send and receive those messages. To broadcast a message, a component such as a publisher simply may push a message to the topic. Although similar to message queues, message topics are different in that they transfer messages with no or very little queuing and push them out immediately to all subscribers. All components that subscribe to the topic receive every message that is broadcast, unless, for example, a message filtering policy is set by the subscriber.

There are two common forms of message filtering: topic-based and content-based. In a topic-based system, messages are published to topics or named logical channels. Subscribers in a topic-based system receive all messages published to the topics to which they subscribe, and all subscribers to a topic receive the same messages. The publisher is responsible for defining the classes of messages to which subscribers can subscribe. In a content-based system, messages are delivered to a subscriber if the attributes or content of those messages matches constraints defined by the subscriber. The subscriber is responsible for classifying the messages.

Some systems support a hybrid of the two: publishers post messages to a topic while subscribers register content-based subscriptions to one or more topics.

Advantages of Pub/Sub messaging systems are loose coupling and scalability. Publishers are loosely coupled to subscribers, and all publishers are allowed to remain ignorant of system topology and to operate independently of the other. In the traditional tightly coupled client—server paradigm which many RESTful systems use the client cannot post messages to the server while the server process is not running, nor can the server receive messages unless the client is running. Many pub/sub systems decouple not only the locations of the publishers and subscribers but also decouple them temporally.

Messaging Pub/Sub provides the opportunity for better scalability than traditional client-server interactions through parallel operation, message caching, tree-based or network-based routing, etc. However, in certain types of tightly coupled or high-volume environments such as enterprises, as systems scale up and servers share the pub/sub infrastructure this benefit may be diminished.

Outside of the enterprise environment, the pub/sub paradigm has proven its scalability to volumes far beyond those of a single data center using protocols that accept higher latency and lack of delivery guarantees in exchange for the ability for even a low-end web server to syndicate messages to large numbers of subscriber nodes.

Figure 5:
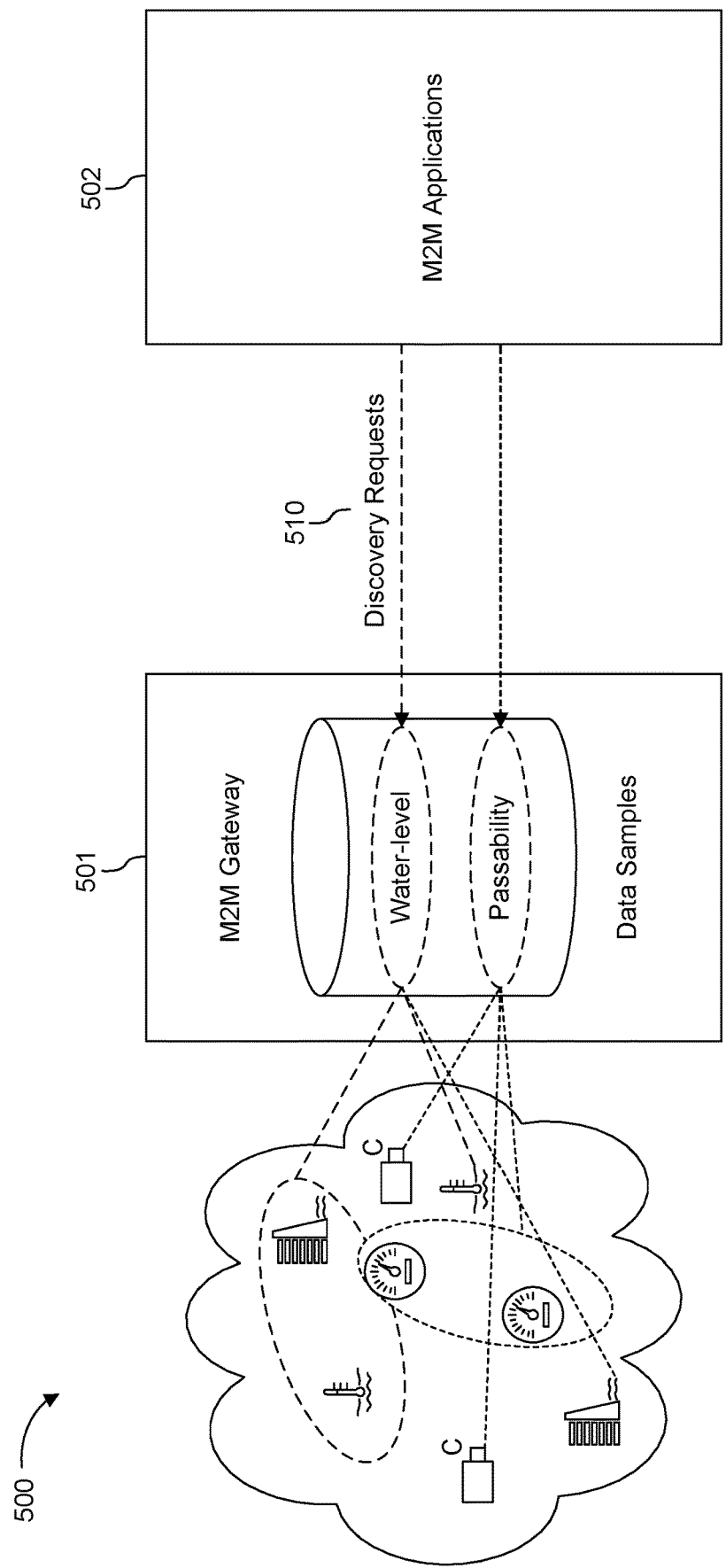
FIG. 5 is a diagram of an example use case.

FIG. 5 is a diagram of an example use case 500. In the example use case of FIG. 5, an M2M gateway 501 may receive discovery requests 510 from a plurality of M2M applications 502. Emergency incidents such as those that arise due to a hurricane require swift action from rescue organizations with high-stakes consequences. To optimize rescue services, there is a need to provide up-to-date information on metrics such as water level and ability to pass a road to a diverse group of providers of emergency services. In the example of FIG. 5, discovery requests 510 for water level and ability to pass a road may be received from the plurality of M2M applications 502.

Moreover, the information needed is very specific (e.g. passable roads in a 5 miles radius, with no specific destination), dynamic, and heterogeneous. It is assumed that data from the public domain (e.g., utility services, townships) and emergency services (e.g. emergency vehicle location and speed) be also available. In such cases, however, other stakeholders (e.g., citizens, companies, etc.) may make additional data sources available.

For example, a rescue group A may target a 5 miles radius for either rescue or medical services. To determine the passable ways in the area there are few indicators available, so any possible indication is useful. For example, the speed of any vehicle is a good indicator of ability to pass a road, and information may be available both from vehicles and cameras. Similarly, street water levels may be provided in this instance by the township such as an environmental monitoring system in a park and public utilities. This data may be stored separately as it is used for different purposes.

Assuming an interested party (e.g. emergency coordinators for team A) has identified the information type and discovery filters that should be used in resource discoveries, e.g. that relevant ability to pass a road information can be obtained from traffic cameras as well as location and speed of vehicles in the area, the discovery request may be re-done periodically as the relevant vehicles change. In addition, new discovery requests (e.g., from other rescue organizations or from citizens) may be sent by other applications based on requests from different users, although the purpose and meaning of the data requested may be the same as in the earlier discoveries. This may also require that other users first determine the relevant information type and discovery filters that would produce this information. Moreover, data from alternative sources may need to be re-interpreted again, for example, the fact that water levels from different sensors (e.g., utitlityWaterSensorX and environmentWaterSensorY) can be used interchangeably has to be re-assessed.

Conventional service layer technologies lack the capability to collect, organize, and expose data (e.g. as #passabilityCanalStreet, #waterLevelAlgiersWest topics) from disparate sets of devices and to provide up to date status and meaning for separate applications in such scenarios. Employing existing discovery and query methods results in a large overhead of requests.

Existing mechanisms for exposing data at the service layer are dominated by the paradigms of the publisher without reflecting the way data is consumed. However, some IoT deployments require that topics for publication be created in a dynamic fashion at gateways as well as infrastructure nodes, e.g. by subscribers.

Methods and apparatuses are described herein for a framework for data brokerage services in a service layer. A service layer service is described herein that receives and processes requests to manage system data within a publish-subscribe topic model. Information provided by system participants may be used to maintain a topology of the publish-subscribe system.

System data may be configured by domains and topics that allow participants to remain loosely coupled and operate independently of each other. The data configuration may be based on a pre-configuration. Alternatively or additionally, the data configuration may be based on explicit or implicit requests based on at least one of: explicit requests from other service layer entities providing comprehensive topic information; pre-configuration providing comprehensive topic information; resource subscription requests and criteria for creation of an associated topic; long-standing query/discovery requests or a history of resource discovery or query requests; and resource announcement requests and indicators that an associated topic should be created. The indicators consisting of one of the following alternatives: announced resource attributes, announcement message parameters, announcement message targets, and ACPs of the announced resource.

Service layer methods for managing system data within a publish-subscribe topics model are described herein. The methods comprise the automatic creation of topic instances by the service layer based on service layer events and triggers including: updates of announced resources and the related synchronization events; long-standing query/discovery settings or repetition of queries/discoveries; and related subscription events.

The methods comprise maintaining dynamically the set of Publishers by using publishing intent based on RESTful messages or indicators included in resource announcement messages. The methods comprise maintaining dynamically the set of subscribers by using subscription intent based on indicators included in long-term discovery messages.

The methods comprise facilitating system data organization by determining a scope of advertisement for a topic or group of topics and sending advertisement messages of the topic with several alternatives such as: notifications with an advertisement indicator; and specialized RESTful messages with an advertisement indicator.

The methods comprise providing additional processing for instances from different publishers before creating post-processed topic instances.

The methods comprise deriving access control policies for topics based on the access control policies of the individual topic instances.

The methods comprise providing arbitration of publication messages based on the strength of the publication and the strength of the publisher.

The methods comprise providing arbitration of subscriptions and notifications based on the strength of the subscription request and the strength of the consumer.

FIGS. 6 to 21 (described hereinafter) illustrate various embodiments associated with the framework for data brokerage services in a service layer. In these figures, various steps or operations are shown being performed by one or more nodes, apparatuses, devices, servers, functions, or networks. For example, the apparatuses may operate singly or in combination with each other to effect the methods described herein. As used herein, the terms apparatus, network apparatus, node, server, device, entity, network function, and network node may be used interchangeably. It is understood that the nodes, devices, servers, functions, or networks illustrated in these figures may represent logical entities in a communication network and may be implemented in the form of software (e.g., computer-executable instructions) stored in a memory of, and executing on a processor of, a node of such network, which may comprise one of the architectures illustrated in FIG. 22A or 22B described below. That is, the methods illustrated in FIGS. 6 to 21 may be implemented in the form of software (e.g., computer-executable instructions) stored in a memory of a network node, such as, for example, the node or computer system illustrated in FIG. 22C or 22D, which may store computer-executable instructions, when executed by a processor of the node, that perform the steps illustrated in the figures and described herein. It is also understood that any transmitting and receiving steps illustrated in these figures may be performed by communication circuitry (e.g., circuitry 34 or 97 of FIGS. 22C and 22D, respectively) of the node under control of the processor of the node and the computer-executable instructions (e.g., software) that it executes. It is further understood that the nodes, devices, and functions described herein may be implemented as virtualized network functions.

Figure 6:
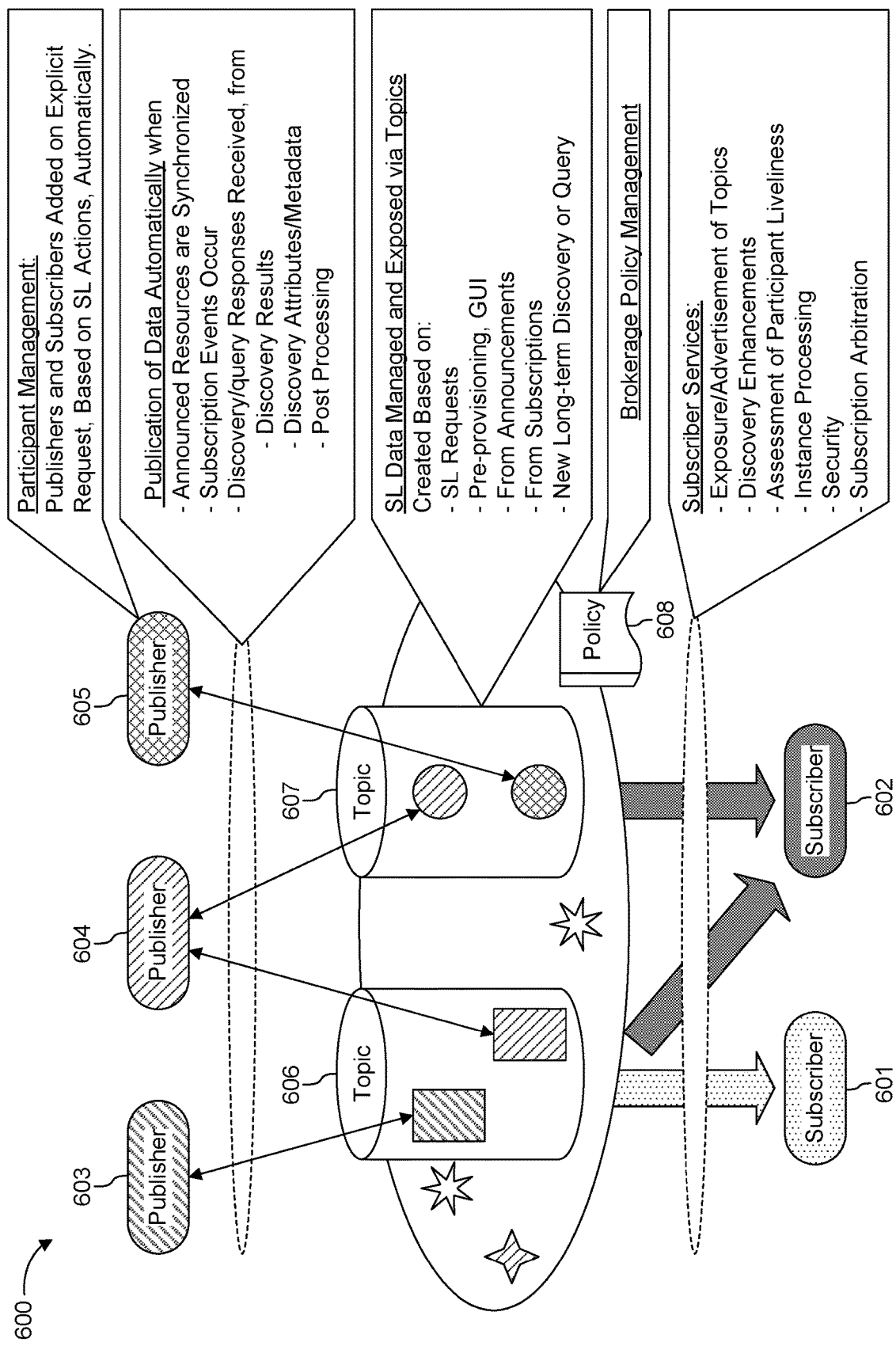
FIG. 6 is a system diagram.

FIG. 6 is a system diagram 600 for a framework for dynamic brokerage and management of topics and data at the service layer. The embodiments described herein are directed to a framework for deploying a data and resource distribution Pub/Sub function in a RESTful system. The mechanisms proposed herein enable data publishers (e.g., publishers 603, 604, and 605 of the example of FIG. 6) and subscribers (e.g., subscribers 601 and 602 of the example of FIG. 6) to remain loosely coupled, without needing to know of system topology and to operate independently of each other, for greater network scalability and more dynamic topology. Subscribers 601 and 602 of the example of FIG. 6 may access topics 606 and 607, which may be managed by policy 608.

The framework described herein enables interworking between RESTful, resource-based service layers (e.g. oneM2M) and Pub/Sub brokers. Service layer Data Brokerage entities are described herein. A broker is an entity that may collect information generated by various nodes or entities in an IoT system for the purpose of making the information available to other system participants, e.g. other entities, users, etc. The services provided by the broker comprise the broker functionality.

The techniques described herein apply to brokers using a Pub/Sub data distribution model, in which the data to be distributed is generated by entities referred to herein as producers. The data is made available to other participants in the systems, referred to herein as consumers. After discovering data of interest, the broker Pub/Sub functionality may allow consumers to subscribe to data of interest and be notified accordingly, therefore becoming subscribers. The broker may also advertise the data to other entities in the system by providing information about the data or characteristics of the data available for subscribing.

While any entity in the system may have brokerage functionality, the example described herein are directed to a broker that is implanted in a centralized entity such as a gateway. The broker may or may not be the service layer registrar for the consumers and producers.

In another example, a broker may be a separate entity with which a SL entity (e.g., a gateway) may interact in order to create/delete topics and publish/un-publish data to these topics.

The examples described herein assume that the broker is implemented within a service layer, but the methods described herein may be used in other deployments. The data may be maintained by the broker in a variety of forms, for example resources or copies of resources, including announced resources, links to resources from a variety of system participants.

The producer may comprise any entity in the system producing data for distribution via the broker. The publisher may comprise a producer that has been linked to one or more topics for which it produces data. The linking process may be referred to as "adding publishers to topics." However, since this is a process which can be implied or abstracted, the term publisher may be used instead of producer for an entity that has the potential to become publisher.

The consumer may comprise any entity in the system interested in making use of data maintained by the broker. The subscriber may comprise a consumer that uses the broker's Pub/Sub functionality to subscribe to data of interest and be notified only about data of interest, without direct interaction with and possibly without knowledge of the publishers.

Figure 7:
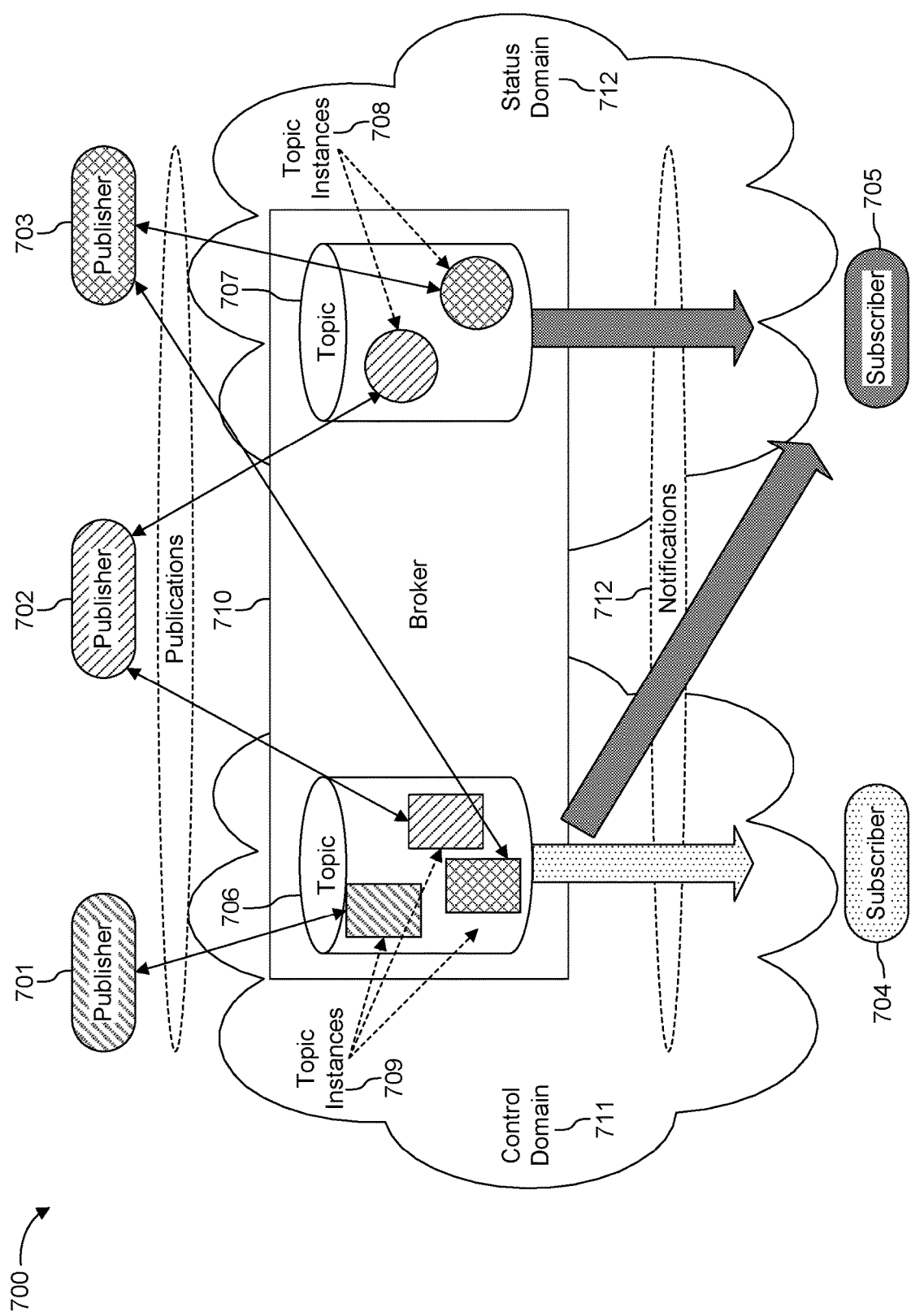
FIG. 7 is a system diagram.

FIG. 7 is a system diagram 700 for a framework for dynamic brokerage and management of topics and data at the service layer. The example of FIG. 7 shows publishers 701, 702, and 703; subscribers 704 and 705; broker 710; topics 706 and 707; topic instances 708 and 709; and a control domain 711 and a status domain 712 in a RESTful system. In a RESTful service layer, topics 706 and 707 may comprise resources representing a container for a collection of data objects (termed topic instances such as the topic instances 708 and 709 of FIG. 7) which are related to each other, for example related via a common meaning, content type, etc. The topic instances 708 may belong to the same topic 707 and may be provided by different producers (such as publishers 702 and 703.

In this context, topic instances may comprise resources or data objects made available at the SL via the process of publication. In a RESTful service layer Topic instances may be resources, resource copies, links to resources, etc. and the same topic (e.g., topic 706) may contain topic instances (e.g., topic instance 709) generated by different entities.

The broker 710 may expose the topic instances to the consumers that subscribe to the parent topic via the process of notification. The example system of FIG. 7 depicts a system in which three publishers 701, 702, and 703 may provide topic instances 708 and 709 for two different topics 706 and 707. Two subscribers 704 and 705 may be notified 712 when new topic instances are generated for one of the topics 706 and 707, but even for the same topic the notifications 712 may be different, based on the processing criteria (e.g. instance filtering) set for each. Topics 706 and 707 may be discovered like any other resource or are subject to proactive advertisements from the broker 710 to consumers, e.g., subscribers 704 and 705.

The RESTful service layer topic concept may be different than the one used in Pub/Sub systems, where topics may provide a lightweight mechanism to broadcast asynchronous event notifications and to connect endpoints in order to send and receive those messages. In that case topics may comprise siblings to message queues for asynchronous broadcast of messages to different parts of a system.

Domains (e.g., control domain 711 and status domain 712) may comprise logical constructs used to bind producers and consumers for communication. A system may use one or more domains for its data-centric communications, providing some isolation between them, e.g. the broker 710 may use different port numbers for each domain. The example of FIG. 7 depicts a system in which two different domains are used, one for control information (control domain 711) and another for status information (status domain 712).

Figure 8:
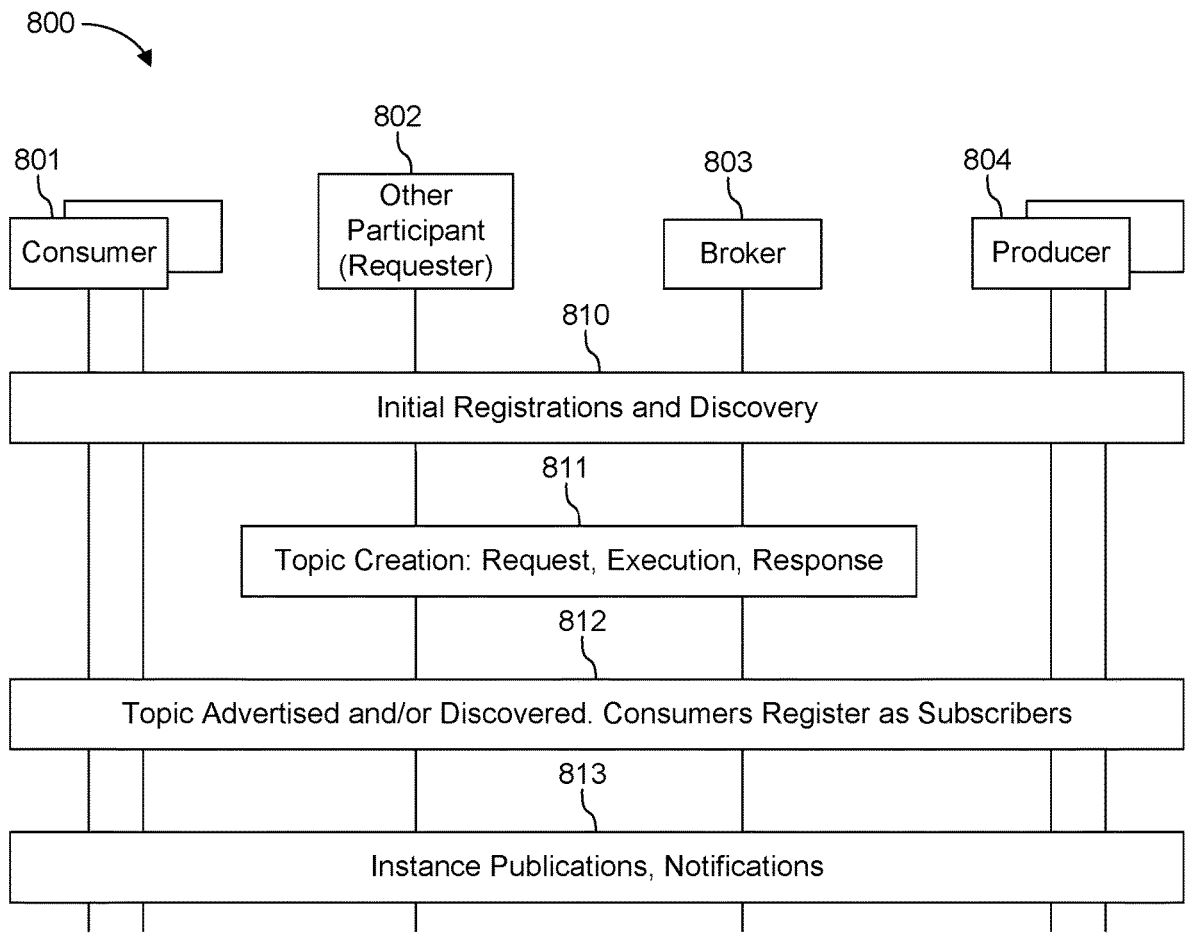
FIG. 8 is a diagram of an example procedure for a logical representation of the various phases of topic and data brokerage processing in a service layer.

FIG. 8 is a diagram of an example procedure for a logical representation of the various phases of topic and data brokerage processing in a service layer 800. The example of FIG. 8 depicts the enablers to be introduced in RESTful service layers in order to provide topic Pub/Sub capabilities. FIG. 8 depicts consumers 801, a broker 803, and producers 804. The example of FIG. 8 also depicts a requester 802 that may comprise a general participant in the system, e.g. a producer, consumer, or an entity with both roles, etc. The requester 802 may also comprise a management entity, such as another broker, etc.

Referring to FIG. 8, in the first phase entities in the system may discover each other and their capabilities (step 810). Service layer registrations may be assumed as pre-conditions and enable service layer communications in general. Different entities may be discovered and based on their capabilities they may become participants in the system as producers 804, consumers 801, or both.

In the second phase a topic may be created at the broker 803 (step 811). This may be accomplished using several methods, as described herein. In the case of a system implementing distributed brokerage or multiple brokers, this step may involve additional interactions between brokers or between a management entity and a broker, and result in new topics being created In the third phase the newly created topic may be advertised or discovered by a consumer 801 (step 812). Consumers 801 may later become subscribers to the topics of interest based on subscription requests and/or policies related to the topic.

In a fourth phase, producers 804 may be added to topics as publishers, after which they may publish instances at the broker 803 and corresponding notifications may be sent to the subscribers (step 813). The producers 804 may be added to topics.

SL Representations for Data Brokerage Entities are described herein. The Brokerage Functionality may be implemented in any SL entity of the system or may be provided by a dedicated entity with which service layers may interact to create/delete topics and to publish/un-publish. As a SL entity, a broker may or may not be the service layer registrar for all the consumers and producers. A broker may be deployed as a central entity such as a gateway. In order to provide this functionality and to be discoverable, a broker may host pertinent information as detailed in Table 4 below. Some Broker information such as the lists of producers and consumers may be provided per domain as part of the domain description instead.

TABLE 4

Broker Information/Description

| Element (e.g. attribute, sub-resource) | Type | Description |
| --- | --- | --- |
| brokerID | ID | Unique identifier for the Broker. |
| domainList | List of sub-resources | List of domains brokered by this entity. Each domain is described as shown in Table 5. |
| consumerList | List of sub-resources or complex parameters | List of consumers registered for each domain. Each Consumer is described by a list of parameters such as: consumerID pointOfAccess ACPs subscribedTopics advertismentGuidance |
| producerList | List of sub-resources or complex parameters | List of Producer entities available to each domain. Each Producer is described by a list of parameters such as: producerID pointOfAccess ACPs publishedTopics |

In a system using multiple domains each domain may be described as shown in Table 5 below.

TABLE 5

Domain

| Element (e.g. attribute, sub-resource) | Type | Description |
| --- | --- | --- |
| domainID | attribute | Identifier of the Domain. Examples: CityXPlatform, ServiceProviderYHomeDomain, ManufacturerYProducts, ManufacturerYEquipment. |
| topicList | List of sub-resources | List of <topic> sub-resources, as detailed in Table 8. |

In a service layer system, consumers may be any entity in the system that is interested in receiving notifications about topics of interest from a broker. In order to provide this functionality and to be discoverable, consumers (or their registrars) may host resources with description information as shown in Table 6 below. Information such as consumerID and domainList may enable discovery by the other entities in the system localConsumerPolicy may be used by the consumer itself advertismentGuidance may be used by brokers to determine consumers in scope of advertisements of topics. activeSubscriptionList may be maintained for local processing, or may be exposed to other entities that may then easily discover all data published by a single Producer.

TABLE 6

Consumer Description

| Element (e.g. attribute, sub-resource) | Type | Description |
| --- | --- | --- |
| consumerID | ID | Unique Identifier as a Consumer in the system. |
| domainIDList | List of sub-resources | List of domain IDs of the domains of interest to the Consumer. |
| localConsumerPolicy | Sub-resource | Parameters indicating how the Consumer's information may be used. For example, the policy may allow or deny the Consumer information to be used by brokers, to proactively discover consumers interested in a new Topic or to advertise new topics to the Consumer |
| activeSubscriptionList | List of subscriptions | Parameter including a list of active subscriptions for this consumer |
| advertismentGuidance | Complex | Parameters used by the Broker to determine the interest of the consumer in specific topics to be advertised. |

TABLE 6-continued

Consumer Description

| Element (e.g. attribute, sub-resource) | Type | Description |
|---|---|---|
| livelinessStatus | Complex attribute | Element indicating the status of liveliness for this participant. An array may be maintained to capture various aspects, e.g. last heartbeat received vs. last publication to specific Topic |
| participantPriority | Integer | Element indicating a relative priority of the Consumer relative to other Consumers in the system. It may be used by the Broker to prioritize the processing for different participants. |

Producers may be any service layer entity in the system producing data for the topics at the broker. A producer may maintain local information as described in Table 7 below. Some of this information (such as producerID, domainList) may enable discovery by the other entities in the system. localProducerPolicy may be used by the producer itself publicationCandidateList may be used by brokers and consumers to determine potential data of interest which may be furnished by the producer. activePublicationList may be maintained for local processing or may be exposed to other entities that may then easily discover all data published by a single Producer.

TABLE 7

Producer Description

| Element (e.g. attribute, sub-resource) | Type | Description |
|---|---|---|
| producerID | ID | Unique Identifier as a Producer in the system. |
| domainList | List of sub-resources | List of domains in which the Producer participates. |
| localProducerPolicy | Sub-resource | Parameters indicating how the producer's information may be used. For example, the policy may allow or deny the Producer information to be used by brokers, when seeking to proactively discover new producers. |
| publicationCandidateList | List of resources | Element providing a list of resources available at the Producer for publication. Alternatively, all resources which are discoverable by the Broker may be candidates. |
| activePublicationList | Complex attribute or sub-resource List | Element indicating the publications the Producer is actively providing. For example, this may be indicated by a pair (Topic, local resource). |
| livelinessStatus | Complex attribute | Element indicating the status of liveliness for this participant. An array may be maintained to capture various aspects, e.g. last heartbeat received vs. last publication to specific Topic |
| participantPriority | Integer | Element indicating a relative priority of the Producer relative to other Producers in the system. It may be used by the Broker to prioritize the processing for different participants. |

Topic resources may provide a container for a collection of topic instances. In a RESTful service layer, topic instances may be assumed to be implemented as resources or links to resources. In addition, the topic resources may include attributes that provide meaning, context and functionality to the given topic. A broker may maintain topic information as described in Table 8 below.

TABLE 8

Topic

| Element | Type | Description |
|---|---|---|
| topicID | ID | Identifier for the Topic, unique in the domain. The concatenation of domainID and topicID is unique system-wide. The topicID may be set to be descriptive or intuitive or a topicDescription element should be provided for that purpose. This is the primary element used for Topic discovery. |

TABLE 8-continued

Topic

| Element | Type | Description |
| --- | --- | --- |
| topicDescription | ID, string, etc. | Descriptive identifier of the Topic used for Topic discovery. Like the topicID, it may be unique in the parent domain, and, together with the domainID, may be unique system-wide |
| topicCreator | ID | Identifier of the topic creator, may be the Broker, another entity, etc. |
| semanticDescription | RDF, etc. | A semantic description of the Topic, which can be used together with topicID and topicDescription for Topic Discovery. In different implementations these elements may be separated or concatenated. At the same time, it is up to implementation how to use one or more of these elements to provide for topic differentiation as needed, e.g. if semanticDescription may be used to identify similar topics, etc. |
| containerIDReference | ID | For topics based on a container, its element references the resource ID of the container. |
| topicGroup | ID, string, etc. | Identifier for a Topic group or subject. This is a categorization of the topics in a system which can be used to create scope, along either the domain and the Topic.<br>Example A:<br>Domains: CityX1Platform, CityX2Platform<br>CityX1Platform has:<br>topics: gasReading, electricityReading, neigborhoodA, neighbourhoodB<br>topicGroups: utilityServices (both gas and electricity), municipalServices, citizenData<br>CityX2Platform has:<br>topics: streetLightLevelZoneA, streetLightLevelZoneB, trafficLevelZoneA, trafficLevelZoneB<br>topicGroups: neigborhoodA, neighbourhoodB, lightingLevel, trafficLevel |
| topicDataType | Data type | Indicates the data type of the Topic Instance |
| maskList | List of attributes | A list of masks for which consumers have subscribed to this Topic. For example, a subscriber may use "publisher = pubA" as a mask, receiving only data available from a specific publisher. Other masks may indicate periodicity of the data, timing constraints, value constraints, etc. |
| timing | Time | List of parameters indicating time-related settings for the Topic, e.g. lifetime, max number of instances, start/end time, etc. |
| publisherList | List of IDs | Parameter indicating the list of the publishers for this Topic. This information might not be exposed, but if it is it may be used by subscribers for masking, discovery, etc. |
| livelinessStatus | Status | Status parameter indicating if the Broker has connection with one or more publisher, as described by the liveliness policy |
| longTermDiscovery | Complex | Complex parameter used for topics based on long-term discoveries. For example, this parameter may contain a semantic discovery request which was used to initially create the <topic> resource |
| associatedDiscoveryHistoryList | List | List used to capture discovery requests used by the Broker to create this Topic. |
| processingCriteria | | Indicates if any data processing should be applied by the Broker when a new Instance is created. For example, it may be specified that two or more publishers provide the same content within a window in order for the content to become an Instance (i.e. apply consistency check), or that specific instance filtering (e.g. by content values, in time, etc.) should be applied. |
| policyList | List of policies | List of policies applicable to the Topic. The policies are used by participants in the system, e.g. Broker, publishers, subscribers, to determine rules governing various functionalities.<br>The list may contain different types of policies, for example: updatePolicy, stalenessPolicy, livelinessPolicy, producerPolicy, subscriberPolicy, retentionPolicy, persistencePolicy, etc. |

TABLE 8-continued

| | | Topic |
|---|---|---|
| Element | Type | Description |
| consumerList | List of IDs | List of consumers subscribed to this Topic. |
| instances | List of objects of type topicDataType | List of Instance objects of type topicDataType. |

Although the broker functionality described herein may be implemented as a stand-alone database which copies data from service layer resources and manages them as instances, the following descriptions assume that the broker is implemented such that the instances are SL resources or links to SL resources. The instances belonging to a topic have data type(s) as indicated by the topicDataType element of the Topic.

In one example, instances may comprise individual existing resources (or resource attributes) identified to belong to the same topic. For example, in oneM2M each application registered to a gateway may create an <AE> resource. If a topic is defined as "registeredAEs", each <AE> resource may become an Instance of the Topic. Each instance may become available when the AEs register or the corresponding resources are modified. In this case topicDataType is the AE data type defined by oneM2M. This case may enable the broker to maintain the topic simply by maintaining a list of the resources used as instances.

In another example, instances may comprise new resources created from existing resource types. This process termed "data transformation" is generally provided by the broker, although publishers may also be enabled to perform it. Alternatives for performing data transformation, as indicated by the processingCriteria, include but are not limited to the following:

(1) Adding metadata: In this case the information available in a SL resource may be augmented with pre-defined metadata and stored as an instance. In the AE example above, the broker may be instructed by the processingCriteria to add information about its own location at the time the <AE> resource Instance was received (i.e. the registration was performed). The data type in this case may be based on the AE oneM2M AE data type and may include a field for the location information.

(2) Trimming resource information: In this case the instance may be created from an SL resource, by using some of its attributes. In the AE example above, each instance may comprise the AE-ID, creator, and timestamp of the <AE> resources received. The data type used is derived from the AE data type and may contain the relevant fields.

(3) Instance Filtering: In this case the processingCriteria may indicate that instances stored at the broker may conform to some filtering rules. For example, the policy may indicate that only instances with a minimum time separation should be stored, and the ones received in the intervening time may be discarded. Other types of instance filtering may indicate for example that consecutive instances should be from different publishers, therefore consecutive instances from the same publisher may be discarded. This mechanism may be used in conjunction with ACPs to arbitrate how publishers are allowed access to the topic.

(4) Content filtering: In this case instances may be filtered based on the resource content. In the AE example above, the policy may allow for instance creation if the AE-ID is within a specific range.

While in some cases data transformation requires that the instance be stored separately from the resource that created it, the broker may be implemented also to use pointers to existing resources without the need to copy the content to a new location. For example, a broker implementation in oneM2M may allow for a Topic to be created based on a <container> resource, and the instances based on the child <contentInstance> resources. In this case the Publisher may not need to be aware of the brokerage activity. The parent <topic> resource may use containerIDReference to point to the container, and each Instance may contain the resource ID of the corresponding <contentInstance>. In oneM2M, in addition to the <container> resource, this method may be employed for content sharing Resources such as flexContainer and timeSeries.

In some embodiments, the same topic may be requested to be implemented with various policies (or other parameters) which may be incompatible. Topic resources may be allowed to have sub-topics (with the same topicID as the parent) such that each subtopic has a set of parameters that fulfills one or more subscribers' needs, while being able to be discovered together. A new publisher or subscriber may then choose the sub-Topic with acceptable parameters. Alternatively, the topic resource may have one or more instances, and some of the parameters, e.g. policies, apply to individual instances. In the following examples, topics may be considered without the use of sub-Topics for simplicity, however they can be very useful in some examples, e.g., for discovery of related topics, group subscriptions, etc.

Brokerage Policies may be used to provide information about the handling of various topic brokerage functional aspects in the system. This information may be static (e.g. pre-provisioned), semi-static (e.g. common to an entire domain for a longer period) or dynamic (e.g. re-configurable by participants using RESTful methods).

Table 9 below provides descriptions for a number of policies proposed. The table reflects a logical division into policy types by the functionality impacted, e.g. how to create topics, how to determine the scope, type, timing, etc. of advertisements to be sent out, but other ways for organizing this information may be implemented. Policies may use generally complex-typed data or information with multiple parameters or attributes which may be implemented in a variety of ways. The description column clarifies the purpose and meaning of the policies and provides examples of only a few of the possible parameters to be included in the complex constructs. The table includes policies that may be available to different participants in the system and that may be provided to these entities during an initial pre-provisioning step or using explicit requests, e.g. RESTful operations on policy resources.

TABLE 9

Policies

| Element | Description |
| --- | --- |
| createTopicPolicy | Determines how topics may be created, e.g. may be pre-provisioned, created by the Broker, etc. For topics created by the Broker, the policy may provide complex rules about how to determine topicID, domainID, etc. The policy may also include rules for how to determine the defaults for the remaining Topic parameters at creation time. |
| updatePolicy | Determines how the Topic is updated, e.g. by the Broker, by the publisher via announcement, by the publisher via notification, mixed. It also indicates if more than one data publishers may be used. |
| stalenessPolicy | Parameters determining how often the Topic is updated. Exact values or ranges maybe used. Conditions such as periodicity at night vs. periodicity during the day, or periodicity per publisher may be used. Flags indicating what should be done if the staleness requirements are not met may be included, e.g. notification sent, Topic deleted, etc. |
| livelinessPolicy | Parameters determining how the publisher liveliness is determined, e.g. using any communications with the node, using data publication only, using a specific notification, etc. The policy may also specify if the liveliness check should be managed by the Broker or by the publishing entity. |
| producerPolicy | Parameters indicating which producers may publish to this Topic, it is used by the Broker to determine if other producers should be added as publishers for the Topic. It can be used by the consumers for Topic discovery or masking, e.g. a potential subscriber might want to discover what producers are available for the Topic. The policy may indicate e.g. types of producers that can be used, specific characteristics (e.g. location), etc. The policy may also indicate how producers can be discovered or added as publishers, e.g. only on demand from producers, on demand from consumers, on periodical discovery by the Broker, etc. |
| consumerPolicy | Parameters indicating which consumers may subscribe to this Topic, it is used by the Broker to determine how to advertise the Topic. It can be used by producers, e.g. to first discover which consumers have access to this Topic. |
| advertismentPolicy | Parameters indicating how the Topic should be advertised to potential subscribers. For example, the policy may indicate that all entities in the consumerList of the parent domain may be provided with advertisements about the Topic, or only a subset. The policy may also indicate other advertisement parameters e.g. periodicity for advertisement, etc. |
| participantDiscoveryPolicy | Parameters controlling the participant (Producer and Consumer) discovery process. This policy is especially useful for the broker, but it may be used by other participants as well, e.g. by Consumers for Producer discovery. For example, the policy may indicate that only entities hosting Consumer or Publisher information may be considered participants. Alternatively, all registrants may be included in discovery requests. The discoveries for Publishers may be restricted to resources in publicationCandidateList or not. A specific scope may be designated for the discovery via a target URI, or specific attributes may be indicated to be used in the discovery |
| instancePublicationPolicy | Parameters indicating how the Topic Instances are created. For example, publishers may be allowed to update only if other publishers also provided updates since their latest Instance |
| instanceRetentionPolicy | Parameters indicating how the Topic retains previous Instances. For example, only a certain number of the latest Instances might be retained, each Instance might be held for a certain duration, each Instance from each publisher might be held for different durations, etc. This policy may indicate for example that older Instances can be retained only if the publisher liveliness conditions are met, or in any case. |
| faultPolicy | Parameters indicating how various fault conditions should be treated. For example, if the processing indicated by processingCriteria is not available at the |

TABLE 9-continued

Policies

| Element | Description |
| --- | --- |
| | Broker or, if available, if the processing cannot be completed for a given Instance. |
| longTermDiscoveryPolicy | Parameters indicating how long-term discovery may be used for the purpose of Topic creation. The policy also includes parameters used to determine the lifecycle of such topics, (e.g. default lifetime). For example, long-term discoveries may be allowed only with explicit requests, only with implicit requests, or both. For implicit long-term discoveries, the policy may specify a default lifetime and weather the lifetime timer restarts with newly received discovery requests, or is based on resource creation time. |
| arbitrationPolicy | Parameters used for implementing arbitration services. For example, a parameter may indicate the lowest publication strength allowed for a topic. The policy may also include the type of algorithm to be used by the Broker for computing request strength based on the participant strength and the proposal strength of the requests. |

The following resource attributes may be used to enable topic brokerage services in a service Layer:

allowTopic: an attribute that may be present in a variety of resource types. If implemented as a Boolean, for example, it may indicate (if TRUE) that the resource may be used for the creation of a topic, which may be published at a Broker. It may be implemented also such that any value may indicate that creation of a topic is allowed, and the value itself may be used in the creation procedure, e.g. as topicDescription value, as semanticDescription, etc.

createTopicCriteria: an attribute that may be present in a resource of a type of subscription. It may provide criteria for topics to be created based on the notifications that are sent as a result of the given subscription.

produces Topic: an attribute that may be present in a variety of resource types. Its value may comprise the resource ID (or a list of IDs) of a topic produced using this resource.

arbitrationProposalStrength: an attribute that may be present in a variety of resource types. When contained in a subscription resource, it may indicate an arbitration proposal strength for the subscription. When contained in other resource types used to create topic instances, it may indicate an arbitration proposal strength for publication.

The message parameters described below may be used to enable topic brokerage services in a service Layer:

topicIndicator: a message parameter used as follows:

When present in an announcement message targeting the Broker, its value may provide the resource ID of the <topic> to which a producer may volunteer to publish.

When present in a notification message, its value may provide the resource ID of the <topic> that the broker is advertising.

When present in other announcement messages with either a default or NULL value, it may indicate that the announcement should be used for a new topic creation.

brokeragePolicy: a request message parameter that may be used to indicate policies to be used for brokerage-related functionality.

longTermDiscoveryIndicator: a parameter for discovery request messages that may be used to indicate that the request is to be repeated by the receiver/broker. When present it may provide parameters for repetition, lifespan, response options, etc. For example, it may provide these parameters as an ordered list, as individual, dependent message parameters or as the resource ID of a resource containing this information.

subscriptionIndicator: a parameter for long term discovery request messages which may also be used for topic creation. By including this parameter, the requester may indicate that it requests to become a consumer once the topic has been created.

brokerageDiscoveryIndicator: a parameter for enhanced discovery request messages that may have several values. When including this parameter, the requester may provide information used by the Broker for providing additional discovery-related functionality.

topicAdvertisementIndicator: a request message parameter that may be used to indicate that the message is used for topic advertisement.

relatedTopicsIndicator: a response message parameter that may be used to indicate topics related to the operation result.

Access control operations such as a PUBLISH ACP operation may be provided. The PUBLISH ACP operation may comprise an enhanced ACP that could support privileges that include the PUBLISH operation in addition to existing operations such as CREATE, RETRIEVE, UPDATE, DELETE. A resource may have an ACP that has PUBLISH privileges that may be used to indicate that it may be published to the broker.

Producer and consumer discovery is described herein. When devices join a service layer deployment, the devices may perform service layer registration that enables communications between entities. Following the registration, service layer resources may be available for discovery, during which entities in the system are recognized as consumers and producers. This process results in the consumerList and ProducerList being maintained at the Broker (see Table 4). There are many methods for designating entities in the system as producers, consumers or both.

Figure 9:
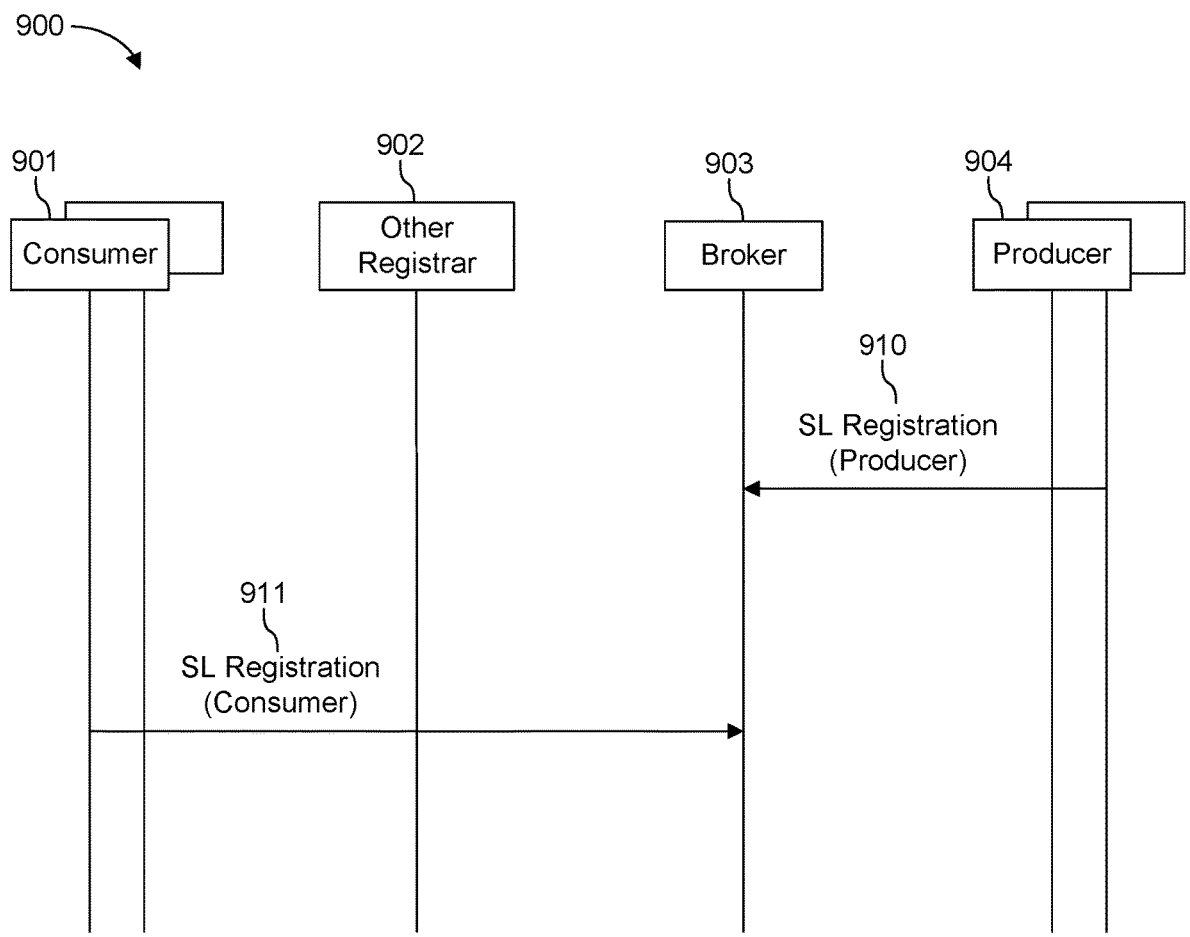
FIG. 9 is a diagram of an example procedure for providing consumer/producer roles via registration directly with a broker.

[Explicit/Volunteering] method: FIG. 9 is a diagram of an example procedure 900 for providing consumer/producer roles via registration directly with a broker. Entities may "volunteer" (i.e. using explicit/volunteering) to be consumers, producers or both, based on local policies. For example, this information may be provided during the regular service layer registration process, as shown in FIG. 9. In the example of FIG. 9, a producer 904 may send an SL registration message to a broker 903 (step 910). A consumer 901 may send an SL registration message to the broker 903 (step 911). When sending the SL registration messages as in the example of FIG. 9, the capabilities may indicate specifically the "Consumer", "Producer, "Consumer and Producer" or "neither" role along with relevant parameters, e.g. producerID, domainID, brokerID. Alternatively, entities may be added explicitly and directly (e.g., via RESTful UPDATE messages) to the consumerList and producerList maintained at the broker (see Table 4). The broker may later send the consumer and producer information (or announce it) to other entities, e.g. another SL registrar. Other explicit forms of indicating the role may be used, for example, by using groups and providing the role to the members as the join or leave each group.

[Announcement] method: In another example, whenever the broker receives a request to create an announced resource, it may assign the role of "Producer" to the originator based on policies. Alternatively, announced resources may have designated attributes (e.g. allow Topic), which may allow the broker to consider them for topic creation. At the same time, this attribute may be used as an indication that the entity providing the announcement may be assigned as producer. This may be complemented by the broker designating consumers based on the ACPs of the announced resource.

[Capabilities & Policy] method: The Consumer/Producer role may be inferred by the broker from policies and other capabilities of the devices and applications. For example, depending on the implementation, any device or application capable of receiving notifications may be designated automatically as a "Consumer", without any other explicit indication. These policies may be pre-configured at the broker, inputted via a graphical user interface (GUI), etc.

Figure 10:
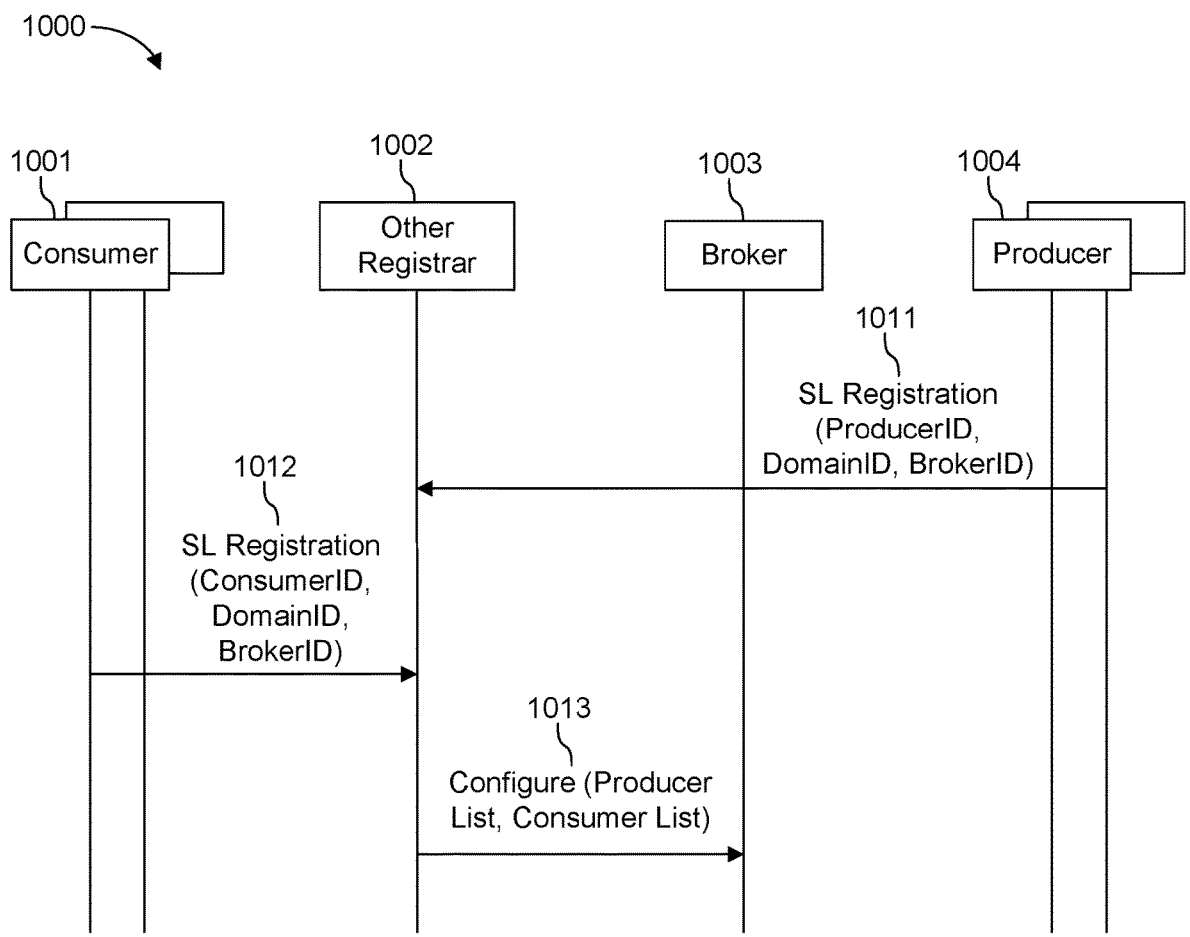
FIG. 10 is a diagram of an example procedure for registrars providing consumer/producer information to a broker.

[Delegated/Removed] method: FIG. 10 is a diagram of an example procedure 1000 for registrars providing consumer/producer information to a broker. In other deployments or implementations, information about Producers and Consumers may be gathered or inferred by entities other than the broker. In the example of FIG. 10, a different registrar may obtain the producer/consumer choices at registration time. For example, a producer 1004 may send an SL registration message that comprises a parameter, such as for example a producerID, a domainID, or a brokerID, to a registrar 1002 (step 1011). A consumer 1001 may send an SL registration message that comprises a parameter, such as for example a consumerID, a domainID, or a brokerID, to a registrar 1002 (step 1012). The registrar 1002 then may use other relevant parameters, e.g. domainID, brokerID, to choose a broker 1003 and configure it with additional producers (e.g., producer list) and consumers (e.g., consumer list) using messages, such as for example RESTful UPDATE messages (step 1013). Although the example of FIG. 10 depicts the use of the [Explicit/Volunteering] method above at the other entity (i.e. other registrar 1002), the [Announcement] and [Capabilities & Policy] methods may also be used by other entities, before configuring the broker. This method also allows for the use of distributed brokers in a system.

[Broker Discovery] method: In another example, the broker may perform regular and repeated discovery and/or query requests in the system and rely upon the results and policies (e.g. participantDiscoveryPolicy) in deciding which entities to add as producers and consumers. For example, a broker managing a Home Control Topic domain may discover entities hosting resources described semantically using the SAREF ontology and automatically add them as both producers and consumers. Repeated requests may result in the entities being removed or added to the lists. The broker may use any of the parameters available at the producer for this purpose. For example, it may use publicationCandidateList attribute to determine if the resources available for publication but not yet published may be used.

Several methods for topic creation and instance publication are described herein which are presented based on the underlying service layer mechanisms used. In some examples, the topic creation methods employed do not need to match the publication methods employed. For example, a topic created based on an announcement may be discovered by a producer that initiates becoming a publisher and publishes instances using explicit requests. Publishers may be added to existing topics.

Figure 11:
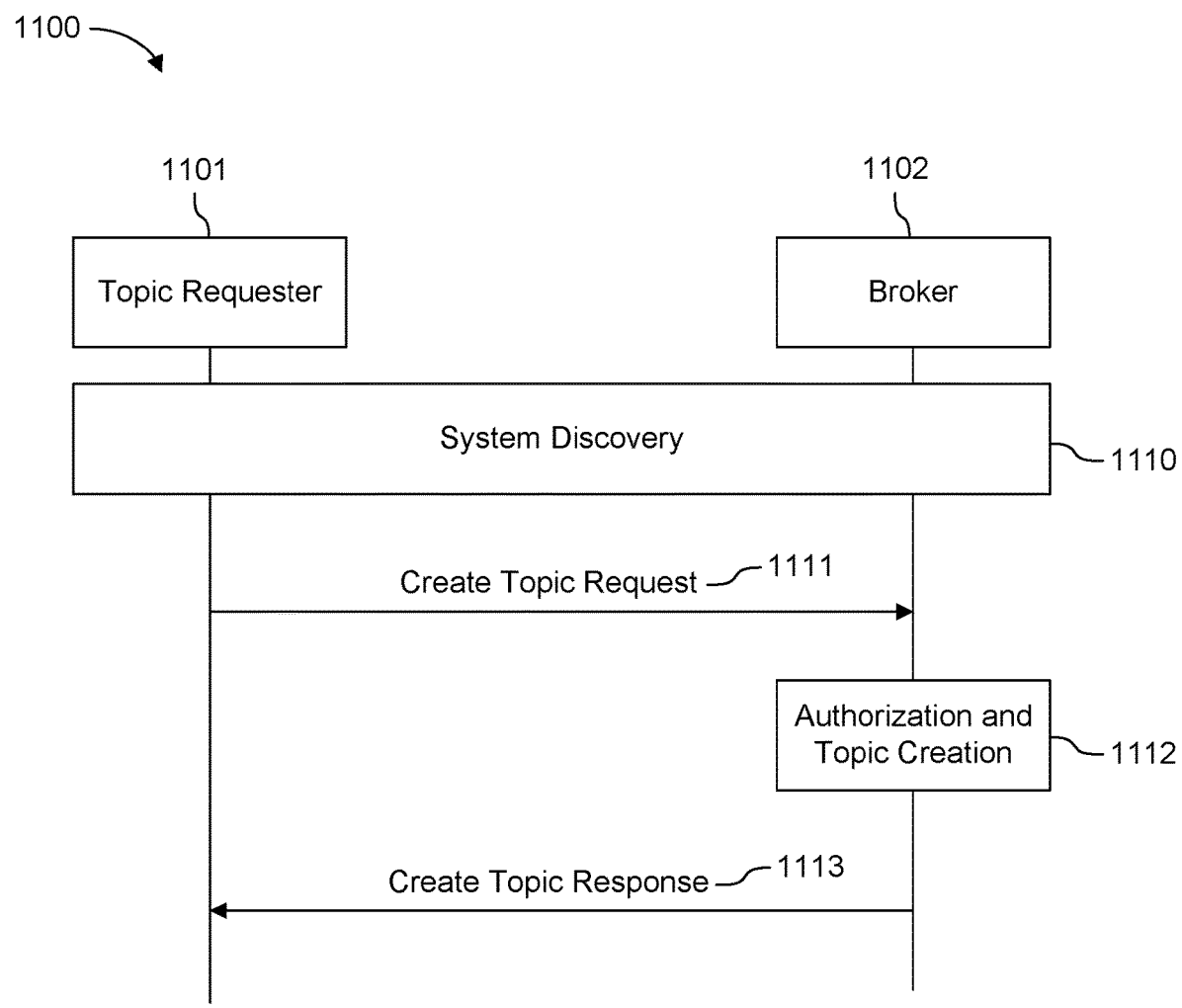
FIG. 11 is a diagram of an example procedure for the creation of topics based on explicit requests.

FIG. 11 is a diagram of an example procedure 1100 for the creation of topics based on explicit requests. In the example of FIG. 11, an authorized entity may request the creation of a topic at the broker, providing specific input. The procedure 1100 of FIG. 11 may be used by any requester to create a new topic in the system. The requester may be a consumer, producer, or any service layer entity in the system. Referring to FIG. 11, a topic requester 1101 may perform an initial discovery step in which it discovers functionality of a broker 1102 (e.g. at a gateway), brokerage policies already available at the broker, etc. (step 1110). The requester 1101 may send a create topic request message to the broker 1102 (step 1111). The message may comprise information needed to initially create the topic, as described in Table 8. Some of the topic-related information, such as brokerage policies, may be already available at the Broker. The broker 1102 may authorize the topic creation and create the topic, e.g. an associated <topic> resource (step 1112). The broker 1102 may send a create topic response to the requester, acknowledging the creation of the topic (step 1113). The response may comprise information such as a resource ID of the newly created resource.

Topics may be pre-provisioned at the Broker or a local function may allow for direct input and management of topics. For systems that provide topic brokerage as a main functionality it can be envisioned that a process similar to that described with respect to the example of FIG. 11 may be used to pre-provision topics. Similarly, the broker functionality may include a management function with a GUI that allows for direct user input of information to be used for topic creation. The pre-provisioning or GUI-based step may corresponds to step 1111 in FIG. 11, and provide the broker with the same information used in step 1112 for the topic creation. The response may be similarly provided via GUI-based responses.

Figure 12:
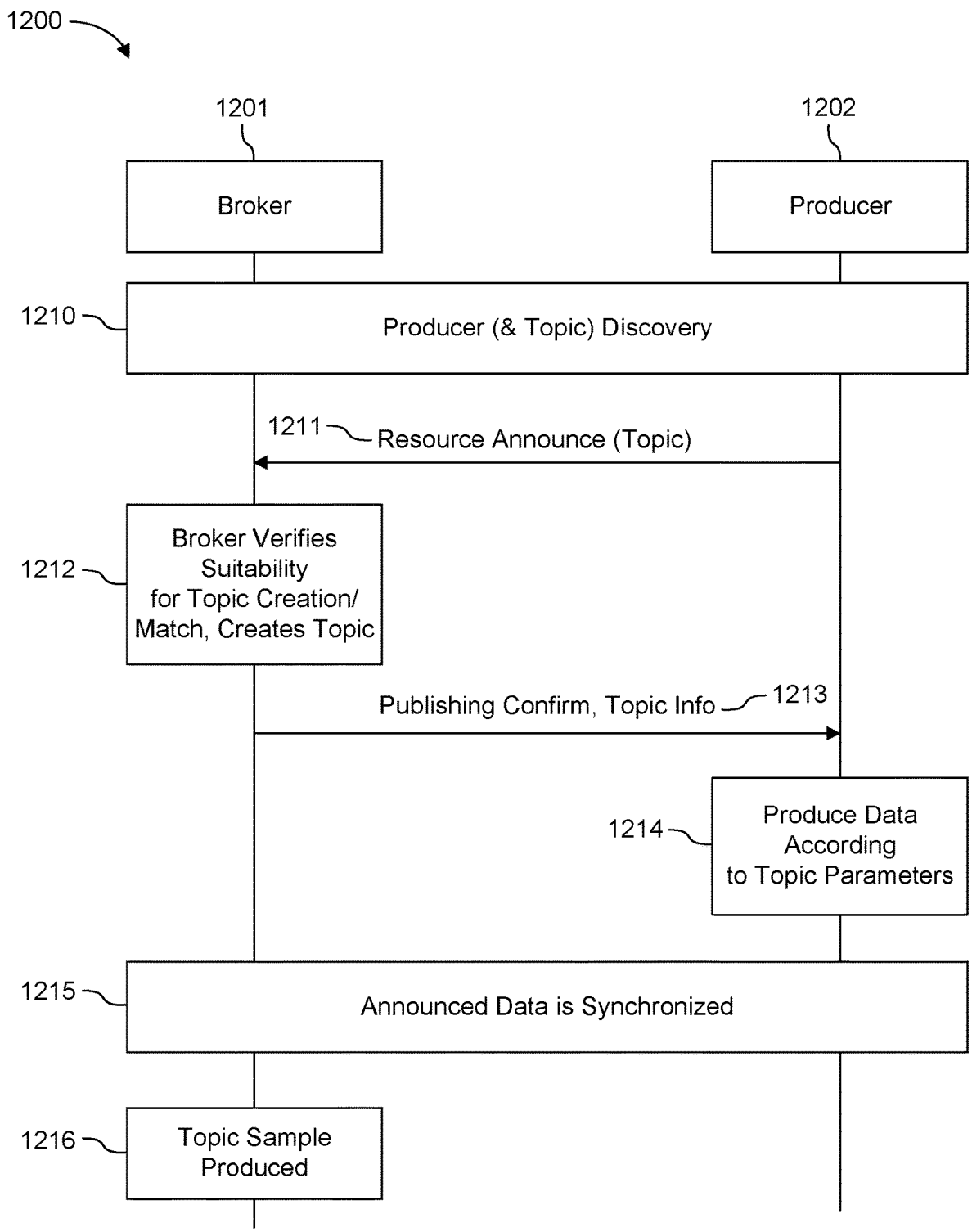
FIG. 12 is a diagram of an example procedure for the creation of topics based on announcements.

FIG. 12 is a diagram of an example procedure 1200 for the creation of topics based on announcements. In the example of FIG. 12, when data is announced, it may trigger the process of creating a topic where subsequent updates of the announce data are to be published. In this example, the service layer announcement procedure is leveraged for topic creation. A broker may receive an enhanced announcement, e.g. using a flag in the create request or an attribute in the Annc resource, showing that the announced resource may be used to create a topic. Alternatively, an existing topic may be indicated. The broker may verify a topic match or suitability for creation and may create the topic. Subsequent updates to the announced resource may be used by the broker to create topic instances.

Referring to FIG. 12, a producer 1202 and a broker 1201 may discover each other and their capabilities (step 1210). The producer 1202 may perform discovery of topics at the broker 1201. The producer 1202 may announce a new data resource at the broker 1201 (step 1211). In RESTful systems, e.g. oneM2M, this may be accomplished by creating an announced resource that is synchronized automatically by the host of the original resource. There are several alternatives for the message to trigger topic creation:

(a) The announced resource may comprise the attribute allowTopic indicating that a topic may be created based on this resource.

(b) The announcement message (i.e. create message in oneM2M) may contain a parameter topicIndicator with a value indicating that a topic is to be created or may be created based on this announcement.

(c) The announcement message may indicate via its target (e.g. the <Broker> resource) that the message is to be used for Topic creation.

(d) The ACPs of the announced resource may indicate that a topic may be created by the broker 1201 based on this resource via its PUBLISH operation.

Alternatives a, b, c, d described above may also be used when the creation message is of a regular resource type, rather than the announced (annc.) type. The various indicators (i.e. allowTopic attribute, topicIndicator message parameter, targeting the <Broker> resource, PUBLISH ACP operation) may be used by the broker 1201 as an indication that a topic is to be created.

Step 1211 may also be used by a producer 1202 to volunteer as a new publisher for an existing topic, with the following alternatives:

The message targets an existing <topic> resource (child of the <Broker> resource); and the message targets the <Broker> resource and include topicIndicator=<Topic>.

In alternatives described above, since the producer 1202 is not an existing publisher to the given Topic, this message may be interpreted as volunteering for the topic.

Referring to FIG. 12, the broker 1201 may verify the suitability of the producer 1202 as publisher to the topic using, e.g., producerPolicy and InstancePublicationPolicy to determine if the Producer can become Publisher (step 1212). The broker 1201 may use the topicCreationPolicy to determine topicID, domainID and defaults for the other parameters of the topic. Alternatively, the announcement message may include the brokeragePolicy message parameter to indicate the policy to be used. The broker 1201 may also use the semanticDescription of the announced resource to further determine how to initially populate the new <topic> resource. The broker 1201 may add the producer 1202 to the publisherList of the topic. If step 1211 already indicated a topic, it may check the suitability of the producer 1202 to become publisher for the topic, e.g., that the ACP of the topic allows the producer 1202 to publish. It may also verify that the instances produced conform to the processingCriteria or that it may enforce the livelinessPolicy with the given producer. If suitable, the broker 1201 may add the producer 1202 to the publisherList of the topic.

Referring to FIG. 12, the broker 1201 may confirm to the producer 1202 that topic creation was successful (step 1213). This may be done, for example, by providing a successful response to the request in step 1211 that comprises as content the newly created <topic> resource for alternatives a, b and c above. For example, the newly created resource may be provided via the relatedTopicsIndicator response parameter. In addition, the broker 1201 may update the activePublicationList of the <Producer> resource or the Producer may perform this action itself, based on the successful response.

The producer 1202 may generate data according to the topic parameters (step 1214). The producer 1202 may retrieve the <topic> resource for this information.

The announced data may be synchronized between the entities by the service layer (step 1215). In oneM2M, the announced resource synchronization may be assumed to be performed by the host of the original resource, i.e. the producer 1202.

The broker 1201 may use the announced data to create new topic instances (step 1216). For example, the broker 1201 may use notifications on the announced data to create new instances. Alternatively, the broker 1201 may implement optimizations such that updates automatically produce new instances, without the explicit involvement of the service layer.

When using the announcement-based method, such as the procedure 1200 of FIG. 12, at least one publisher may be known at topic creation time. This procedure may also include a method for instance publication based on an announcement. This method may be applied also when a producer 1202 announces data to a service layer (e.g., step 1211 is an announcement from the producer 1202 to SL1). This announcement then may trigger SL1 to publish this data to the broker 1201.

Figure 13:
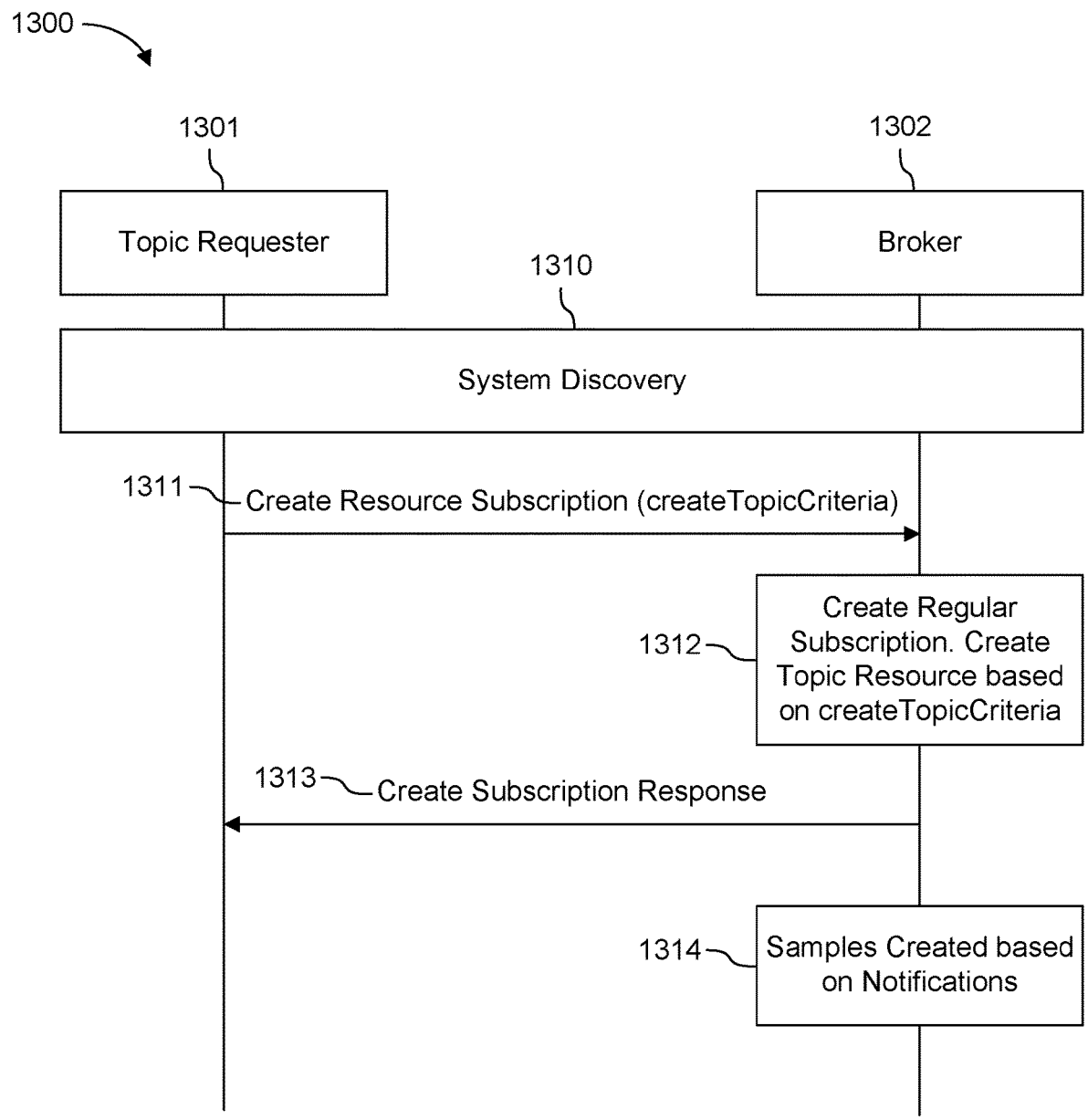
FIG. 13 is a diagram of an example procedure for the creation and publication of topics based on generic subscriptions.

FIG. 13 is a diagram of an example procedure 1300 for the creation and publication of topics based on generic subscriptions. Subscriptions to resources may request that a topic and its instances be automatically created by the broker from the notifications requested. This may enable other participants to discover this information as a Topic, instead of submitting additional subscription requests. In the example of FIG. 13, a service layer subscription procedure may be leveraged for topic creation. An enhanced subscription request to a generic resource may be received by the broker, e.g. by receiving a create request for a subscription resource with the createTopicCriteria populated. Along with the creation of a generic subscription, the broker also may create a topic resource and may include itself in the generic subscription notification recipients. The broker may generate the topic instances from the corresponding notifications. Alternatively, an existing topic may be indicated by createTopicCriteria, which may be used to add the subscribed-to resource to the topic as a producer.

Referring to FIG. 13, system discovery may occur, in which a requester 1301 may discover a resource of interest at the broker 1302 (step 1310). A create resource subscription request may be received at the broker 1302 from the topic requester 1301, targeting the resource of interest (step 1311). In RESTful systems, this step may be accomplished by a create operation that includes a subscription resource. In this case, the subscription resource provided has the createTopicCriteria attribute populated.

The broker 1302 may use the createTopicCriteria and may create a topic resource accordingly (step 1312). The broker 1302 may also create the generic subscription according to the other parameters in the subscription resource. The broker 1302 may include the (subscribed to) resource of interest as a producer for the newly created topic. The broker 1302 may include the subscription requester as a consumer for the newly created topic.

The broker 1302 may confirm to the requester 1301 that the subscription creation was successful and may include information about the newly created topic in the response (step 1313). This is may be done, for example, by providing a successful response to the request in step 1311 which may include the relatedTopicsIndicator response parameter pointing to the newly created topic.

The broker 1302 may use the notification data to create new topic instances (step 1314).

Topics may be created and published based on long standing resource discoveries or queries. When a long-standing resource discovery is received, it may trigger the process of creating a topic. Service layer discovery procedures may be leveraged for topic creation. The topic maintained at a broker may be created and updated by the broker performing repeated or long-standing resource discovery (or query) requests. A long-standing resource discovery request is an extension of a resource discovery request in which a broker continues to provide notifications to a requester after the initial discovery request. The broker may verify that the request conforms to existing policies and that it is authorized, and may then create a corresponding topic resource.

Method for creating and publishing topics based on long standing resource discoveries or queries include but are not limited to the following:

(A) Triggered by an explicit creation request for a topic with the longTermDiscovery attribute already populated. The Broker may us the discovery request provided by the longTermDiscovery attribute to first determine the producers, then may create the topic.

(B) Triggered by a requester using an explicit long-term discovery request. This may comprise a service layer discovery request with an indication that it is long standing, and that a <topic> resource should be created based on its results.

(C) Triggered by the Broker based on past discovery requests. In this alternative, when the broker observes that the same discovery requests have been received repeatedly from the same or different entities, it equates this to a long-standing resource discovery request.

For each of the above alternatives, the processingCriteria parameter may be used in managing topics based on long-standing discoveries to indicate that the instances generated by the broker may be: the actual discovery results, i.e. a collection of resources, or the query results; specific attributes of the discovery result, e.g. a count of the resources discovered, a list of all the creators of the discovered resources, etc.; and results of post-processing content of the discovered resources, e.g. a value equal to the average derived from the content from all the <contentInstance> resources discovered.

For the explicit alternatives (A and B), in managing topics based on long-standing discoveries, the processingCriteria parameter may be used to indicate that the instances generated by the broker may be created.

All the long-standing discovery request methods may also be used for long-standing queries, including semantic queries. The broker may use additional topic parameters to determine how the long-term discovery requests are to be performed. For example, the information in the maskList of the topic may indicate a rate at which the consumer desires to be provided with instances. The broker may then choose to time the repetition of the discovery to meet these requirements.

Figure 14:
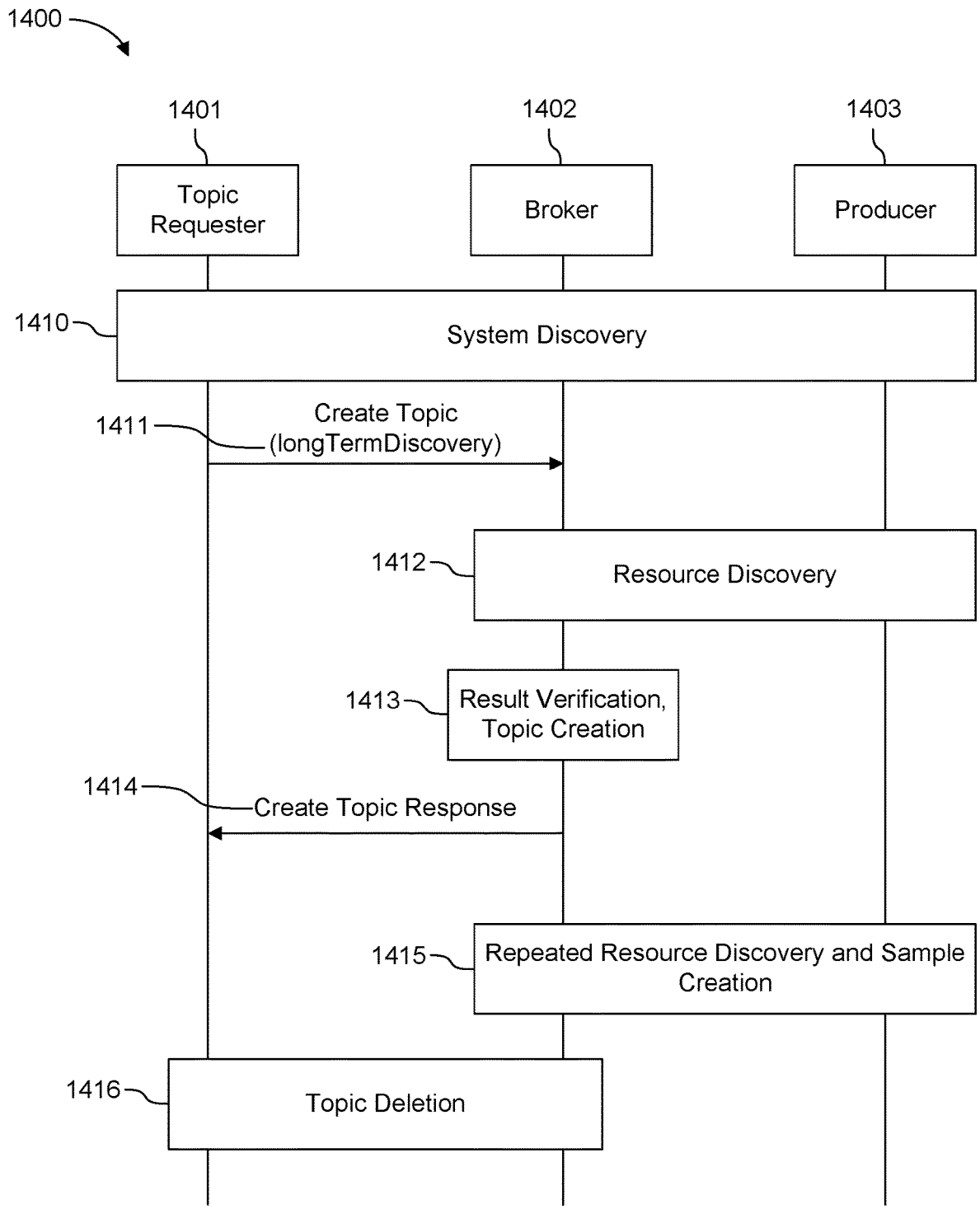
FIG. 14 is a diagram of an example procedure for the creation and publication of topics based on long standing resource discoveries or queries.

FIG. 14 is a diagram of an example procedure 1400 for the creation and publication of topics based on long standing resource discoveries or queries. In the example of FIG. 14, an explicit create request may be received that comprises a longTermDiscovery resource attribute. A broker may receive an enhanced resource discovery request that indicates that the result itself should be used to create a topic. The broker may verify that the request conforms to existing policies and that it is authorized, and then may create a corresponding topic resource. The broker may repeat the discovery to create subsequent topic Instances.

Referring to FIG. 14, a system discovery procedure may be performed, during which a requester 1401, producers 1403, and a broker 1402 may be discovered by each other and their capabilities (step 1410). The requester 1401 may request the creation of a topic that comprises the information used for the creation of a topic (e.g. <topic> resource parameters) including a long-standing-discovery request, i.e. the resource attribute longTermDiscovery comprises a discovery request (step 1411). The broker 1402 may verify and may authorize the topic creation request and then may perform the requested resource discovery or query and then may store the result (step 1412). The broker 1402 may create a new <topic> resource and may use the results of the discovery request topicCreationPolicy to determine topicID, domainID, and defaults for the other parameters of the resource (step 1413). The broker 1402 may also use the semanticDescription of the discovered resources to further determine how to initially populate the new <topic> resource. The broker 1402 may populate the publisherList of the topic with itself.

The broker 1402 may confirm to the requester 1401 that topic creation was successful (step 1414). This may be done, for example, by sending a successful response to the step 1411 request that comprises as content the newly created <topic> resource. The broker 1402 may repeat the resource discovery and may produce data according to the topic parameters (step 1415). The broker 1402 may store the results as instances of the given <topic> resource. The broker 1402 may use optimizations when repeating the resource discovery, e.g., may use a restricted scope based on previous results, providing further advantages to having consumer-driven discoveries.

The topic may be deleted either explicitly by an authorized requester 1401, using RESTful methods or by the broker 1402 based on the parameters provided, e.g. lifetime or start/stop time in the timing parameter of the topic (step 1416). Alternatively, the allowed methods for deletion may be provided by local policies e.g. longTermDiscoveryPolicy.

Figure 15:
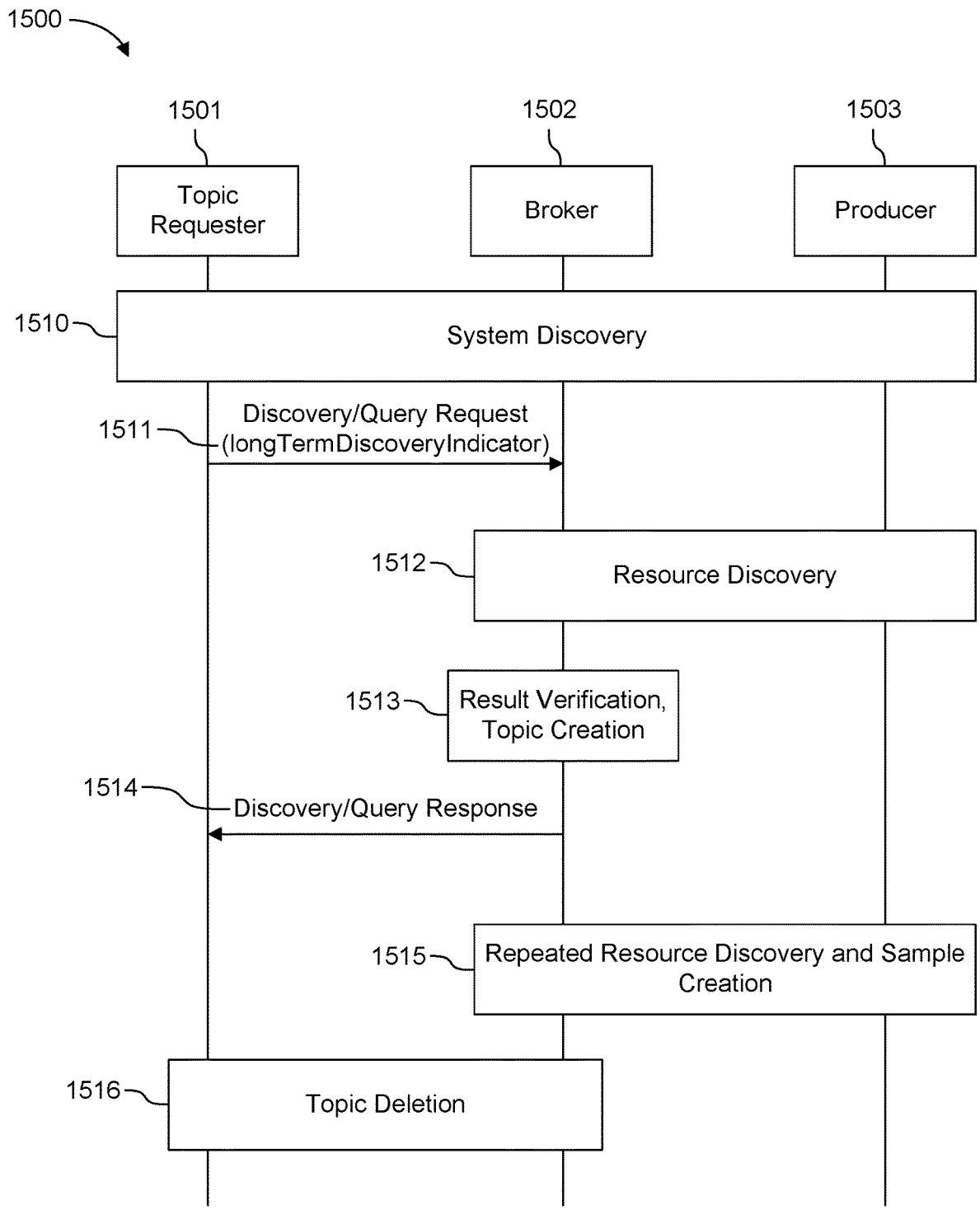
FIG. 15 is a diagram of an example procedure for explicit long-term discovery or query requests.

FIG. 15 is a diagram of an example procedure 1500 for explicit long-term discovery or query requests. In the example of FIG. 15, a broker may receive as a trigger a service layer discovery or query request, e.g. a RESTful retrieve operation. Referring to FIG. 15, a requester 1501, a broker 1502, and a producer 1503 may perform system discovery (step 1510). A SL discovery or query request message may be received, from the requester 1501, comprising an indication that it is long standing and therefore is to be repeated and managed by the broker 1502 (step 1511). Such a discovery request may be implemented using the longTermDiscoveryIndicator message parameter as described herein. The resource discovery or query request may also indicate that the result itself is to be used to create a topic. This indication may be implemented using the topicIndicator message parameter set to NULL or default value as described herein.

The broker 1502 may perform initial resource discovery or query (step 1512). If the discovery message includes topicIndicator set to NULL, the broker 1502 may proceed with <topic> resource creation (step 1513). The broker 1502 may rely upon local policies (e.g. longTermDiscovery-Policy, createTopicPolicy) for attribute defaults or may use the policy indicated in the discovery message by the brokeragePolicy message parameter. Alternatively, the broker may proceed to step 1513 after checking that the discovered resources have the allow Topic attribute present and set to TRUE. The broker may then store the received discovery request in the longTermDiscovery attribute and itself in the publisherList attribute of the newly created resource. The broker 1502 may send a response to the requester 1501 comprising information about the newly created topic, e.g. via the relatedTopicsIndicator response parameter (step 1514). The broker 1502 may repeat the resource discovery and instance creation (step 1515). The topic may be deleted either explicitly by an authorized requester, using RESTful methods or by the Broker based on the parameters provided e.g. longTermDiscoveryPolicy (step 1516).

The discovery or query message may be long standing without having a topic creation indication, i.e. without the topicIndicator message parameter or without the allow Topic attribute being present and set to TRUE in the discovered resources. In this case the broker 1502 may store the discovery request locally and may manage it, sending the results after every discovery repetition. The procedure 1500 of FIG. 15 may implement long-standing discovery requests in a service layer without the explicit implementation of topic brokerage.

Alternatively, implicit long-term discovery based on discovery history may be implemented. In this alternative, when a broker observes that the same discovery or query requests have been received repeatedly from the same or different entities, it determines that this is a long-standing resource discovery request. The procedural flow is similar to the one depicted in FIG. 15, with the following exceptions:

In step 1512, the broker 1502 may receive a regular resource discovery that has been performed repeatedly before. The broker 1502 determines that this repetition may be associated with a request to create a topic based on long term discovery, i.e. with a create topic message including the longTermDiscoveryIndicator and the topicIndicator message parameter set to NULL. The broker 1502 may also use algorithms capable of deriving a long-term discovery or query request from a historical set of related but not necessarily identical discovery requests. The way the broker may use the resource discovery history in this case may be determined based on local policies or explicit settings. The broker may then proceed with the creation of a dedicated topic resource as described in step 1513 of FIG. 15. The broker 1502 may store some or all of the discovery or query request history used in deriving the topic in associatedDiscoveryHistoryList, which may be later used to provide more context for topic discovery. In step 1514 the broker may send a response to the regular resource discovery request that triggered implicitly the topic creation. The response may include information about the newly created resource, e.g. via the relatedTopicsIndicator response parameter. The broker 1502 may rely upon regular topic discovery procedures for consumers to discover the newly created <topic> resource. Alternatively, the broker 1502 may announce the newly created resource to entities that have performed the discovery repeatedly in the past. The broker 1502 may also repeat the resource discovery and Instance creation as described in step 1515. The Broker may use the longTermDiscoveryPolicy to determine how to manage the lifecycle of such topics, e.g. a default lifetime. For example, long-term discoveries may be allowed only with explicit requests, only with implicit requests, or both. For implicit long-term discoveries, the policy may specify a default lifetime and whether the lifetime timer restarts with newly received discovery requests, or is based on resource creation time.

Figure 16:
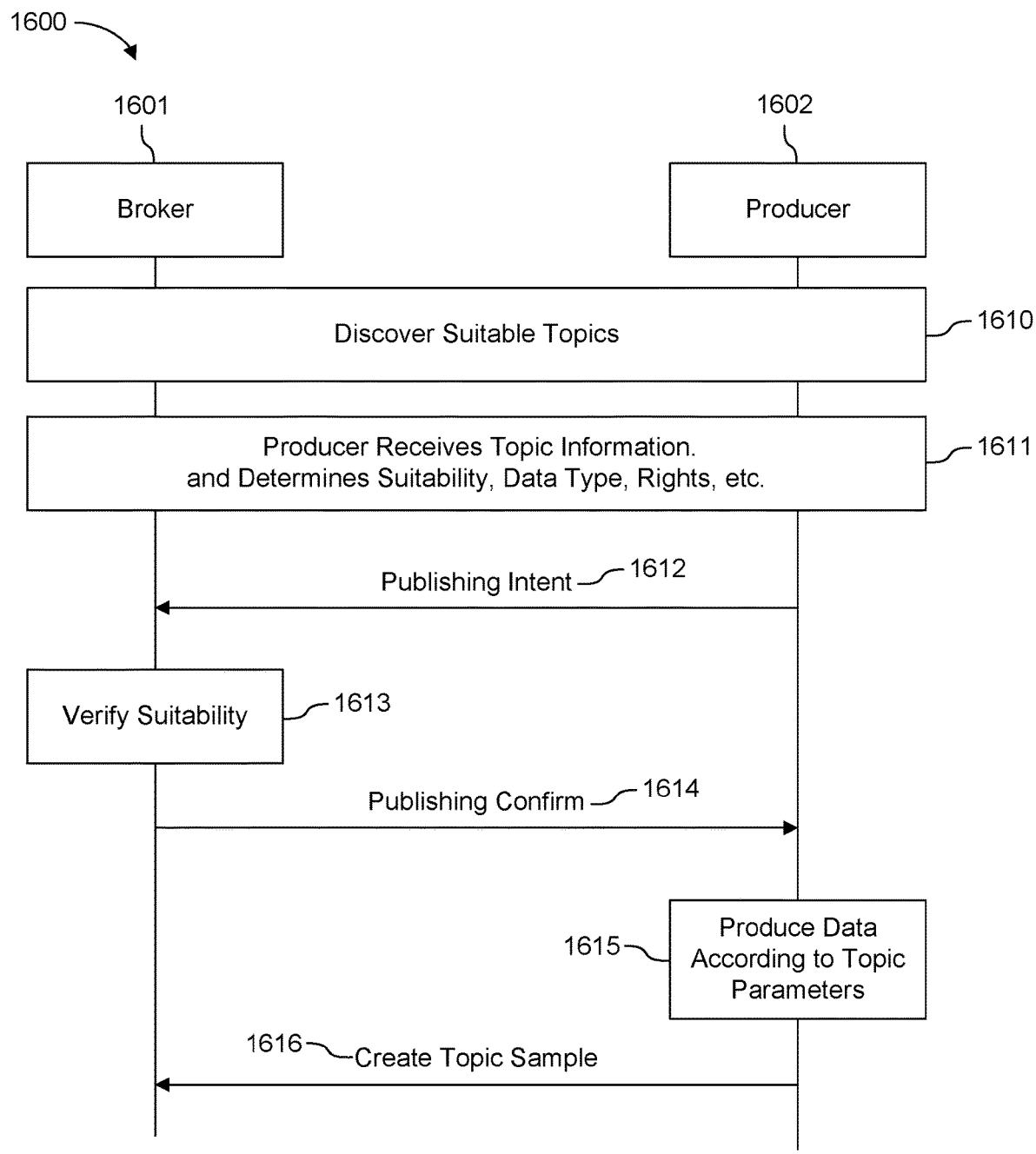
FIG. 16 is a diagram of an example procedure for explicit instance publication.

FIG. 16 is a diagram of an example procedure 1600 for explicit instance publication. In the example of FIG. 16, new producers may provide instances for existing topics. After the topic is discovered there may be a determination of suitability of the producer as publisher to the topic. If suitable, the producer may be added to the publisher list of the topic and instances may be provided to the broker. The procedure 1600 of FIG. 16 may be employed for providing publishers for topics created without known initial publishers, as well as adding publishers to topics which already have one or more publishers. The methods described are alternatives that may be used with any topic creation alternative described herein. All topic creation methods may comprise providing a fixed/set list of producers as publishers. The role may be discovered by the producers via topic advertisement, discovery or pre-provisioning (e.g. using the producer description in Table 7).

In the procedure 1600 of FIG. 16, a producer 1602 may be provided information about a suitable topic. The producer 1602 may determine if it can provide topic instances based on the topic information received, and if the topic is suitable the producer 1602 may provide Instances via RESTful methods e.g. UPDATE messages. Referring to FIG. 16, the producer 1602 may have has discovered suitable topics for publishing (step 1610). This may be accomplished in a variety of ways, e.g. via discovery of topics at the broker 1601, via broker 1601 advertisement of topics, pre-provisioning, etc. The producer 1602 may receive topic information, e.g., the parameters described in Table 8, including the associated policies (step 1611). This information may be retrieved by the producer 1602 or advertised by the broker 1601, or may be provided to the producer 1602 by other entities or via pre-provisioning. The information available about the topics may be used by the producer 1602 to determine if it can fulfill the publisher role for that topic. For example, it may use the producerPolicy and InstancePublicationPolicy to determine if it can become publisher for that topic. It may use the InstanceRetentionPolicy and InstancePersistencePolicy to determine if the instances it may produce meet any other local policies and settings. It may use the timing parameters to determine whether the instances can be produced with the necessary frequency and timing. It may use the semanticDescription of the topic to further determine whether the instances to be provided match the topic.

Referring to FIG. 16, the producer 1602 may inform the broker of its intention of publishing to the topic (assuming the verification in step 1611 allows it) (step 1612). This may be done, for example, by updating the publisher list of the topic. The broker 1602 may verify the suitability of the producer 1602 as publisher to the topic (step 1613). In addition to checks such as those performed in step 1611, the broker 1601 may verify, for example that the ACP of the topic allows the producer 1602 to publish. It may also verify that it can enforce the livelinessPolicy with the given Producer. In another example, a system may rely solely on the broker 1601 to discover producers 1602 and may verify their suitability, in which case steps 1611 and 1612 may be merged into step 1613.

The broker 1601 may confirm to the producer 1602 that publication to the topic has been verified (step 1614). This may be done, for example, by updating the activePublicationList. The producer 1602 may produce data according to the topic parameters (step 1615). If the process relied on only the broker 1601 to verify topic suitability, the producer 1602 may retrieve necessary topic information at this step as well.

The producer 1602 may use the data to create new topic instances, for example it may use RESTful create or update messages to provide new instances (step 1616). Topic instance creation may be subject to ins tancePublication-Policy and instanceRetentionPolicy. For example, an explicit publishing RESTful message may fail at the broker 1601 if the ins tancePublicationPolicy specifies a publication rate and the message arrives too soon. Similarly, the instanceRetentionPolicy may determine which instances may be available at a specific time.

In another example, instances that are produced by a broker may be based on updates to resources that are announced. The procedure is similar as that described in steps 1215 and 1216 of announcement-based topic creation described above with respect to the procedure 1200 of FIG. 12. After the producer may discover a suitable topic, it may perform a resource announcement in step 1211 with a message targeting an instance of a <topic> resource, or in an alternative targeting the <Broker> resource and including topicIndicator=<Topic>. The broker may perform the necessary verifications and may confirm the producer as publisher for the given topic.

Subsequently, the broker may produce the topic instances based on the resource announcement, subject to instancePublicationPolicy and instanceRetentionPolicy. For example, the broker may produce new instances based on the publication rate in the ins tancePublicationPolicy, rather than the rate at which the announced resource is being synchronized. Similarly, the broker may use the instanceRetentionPolicy to determine which instances to be made available at any specific time.

Figure 17:
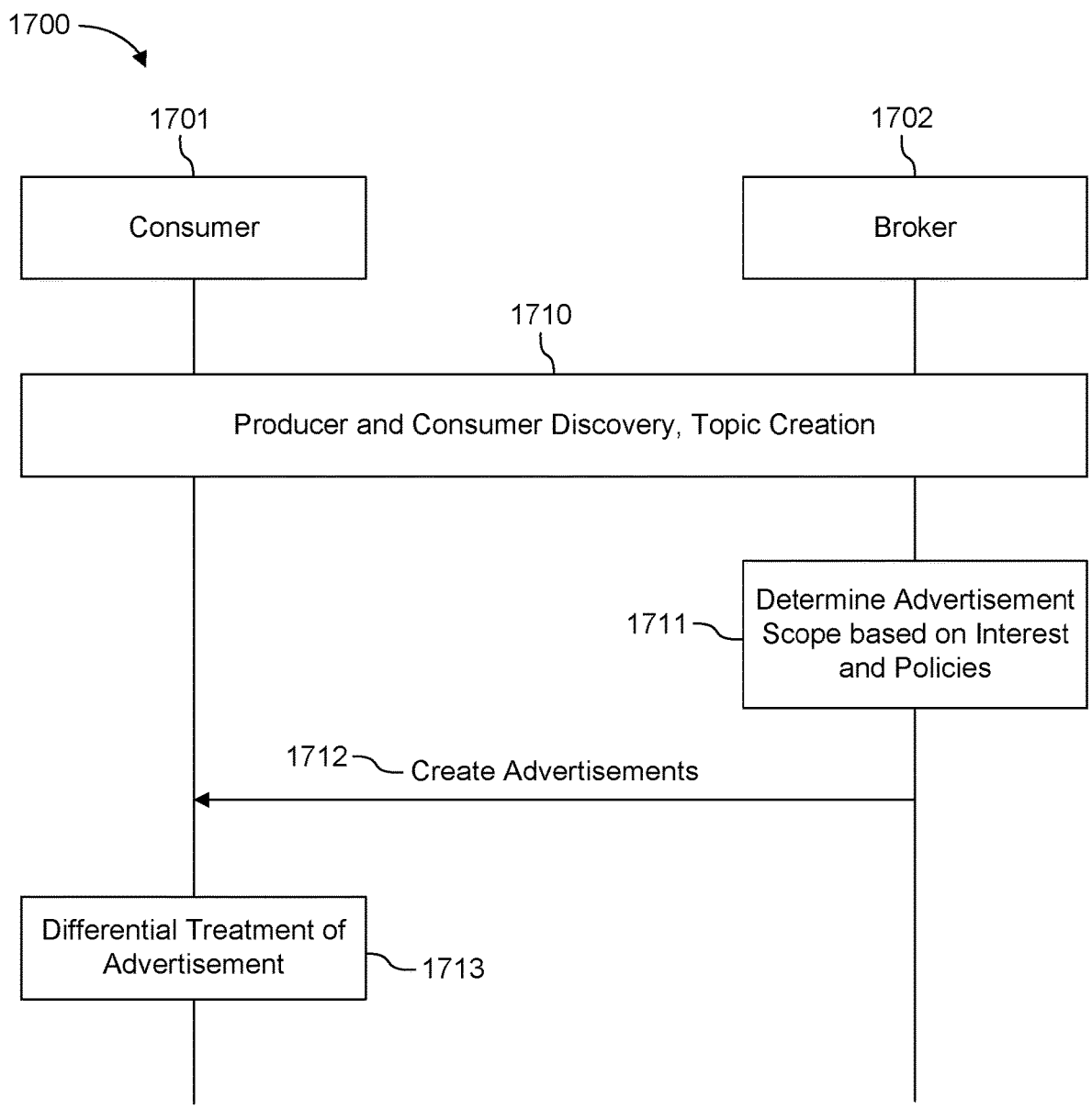
FIG. 17 is a diagram of an example procedure for topic advertisement.

FIG. 17 is a diagram of an example procedure 1700 for topic advertisement. In the example of FIG. 17, a broker may facilitate topic discovery by using the stakeholders (consumers and producers) registered to the domain. The broker may facilitate data sharing by advertising the data on behalf of the producers. Referring to FIG. 17, a producer and consumer 1701 may perform discovery (step 1710). Topics may have been created at the broker 1702. In order to facilitate data sharing, the broker 1702 may provide services for advertising the topic available. Each topic may have an advertismentPolicy that determines parameters such as timing, frequency, and scope of advertisements. In addition, consumers may have advertisement-related policies included in the localConsumerPolicy and advertismentGuidance parameters used by the broker 1702 for this purpose. The broker 1702 may determine the advertisement scope for the topics based on these parameters (step 1711). Assuming, for example, that the broker 1702 decides in step 1712, based on policies, to advertise a set of topics (e.g. A, B) to all the consumers registered to a specific topic (e.g. X), there are several methods for implementing the advertisement.

For example, (a) the broker 1702 may send regular create messages to the given consumers (step 1712). The messages may contain the entire resource or select parameters of the resources to be advertised, e.g. <topicA>, <topicB>. In another example, (b) the broker 1702 may announce Topics A and B to the given consumers, i.e. in oneM2M by creating <topicAannc>, <topicBannc>. In another example, (c) the broker 1702 may send a dedicated advertisement message to the consumer. In a RESTful environment, these specialized messages may be implemented for example as create or retrieve messages, with a topicAdvertisementIndicator message parameter. In yet another example, (d) the broker 1702 may send a notification, e.g. including the topicIndicator message parameter with the resource IDs of <topicA> and <topicB> resources.

In implementations such as oneM2M, regular notifications may be sent only in response to explicit subscription requests, and they include the specific parameters (e.g. request ID, notification URI, event category) specified by the subscription. Advertisements may use these regular notification mechanisms with modifications to implement the notification message method (d) described above. For example, the advertisementPolicy may include a specific request ID, notification URI or event category to be used for all advertisement notifications. Alternatively, the policy may include rules for creating such parameters dynamically, e.g. based on subscriber ID, topic domain, etc. In addition, the notification message may include the topicIndicator message parameter providing the resource IDs of the topics advertised.

Referring to FIG. 17, upon receipt of the advertisement, the consumer 1701 may determines if it should act upon the information receives, e.g. by initiating a subscription to <topicX>, otherwise it may ignore the advertisement (step 1713). In either case, the consumer 1701 may decide to maintain locally information about the topics available in the system.

If the received message was a regular create operation with a <topic> resource as a payload, or an announcement (methods a and b above) the consumer 1701 may choose if it wants to create a local <topicA> or <topicAannc> resource (implements special handling for these types of resources only). The consumer 1701 may decide to maintain locally information about the topics available in the system, but not necessarily to create the resources.

An authorized entity may request to subscribe to a topic based on an explicit request by providing specific input. A regular subscription procedure may be used by any requester to subscribe to a topic in the system. Once the request is accepted and the subscription created, the requester may become a consumer. In addition to the regular criteria available for resource subscriptions, brokerage enables consumers to use a mask in the maskList of the topic to specify additional criteria for subscription. For example, a subscriber may use "publisher=pubA" as a mask, receiving only data available from a specific publisher, although the topic itself may be published by several publishers and available to other consumers as such. Other masks may indicate periodicity of the data, timing constraints, value constraints, etc. Given that the topic may contain several instances, this may be equivalent to having subscription criteria for more than one resource at a time. It also means that subscription criteria may address parameters related to the relationships between the Instance resources, e.g. a specific instance generation rate.

When a long-standing resource discovery is received, it may trigger the process of creating a subscription to a topic. This method may be used by any requester when using an explicit method of topic creation based on long standing resource discovery, for example by using the methods described above with respect to FIGS. 14 and 15. To also subscribe to the topic, the requester may include a subs criptionIndicator message parameter in a create request or discovery request. Once the request is accepted and the subscription created, the broker may automatically create a topic subscription for the requester. Therefore, the requester may become a consumer and may be added to the topic consumerList by the Broker.

Figure 18:
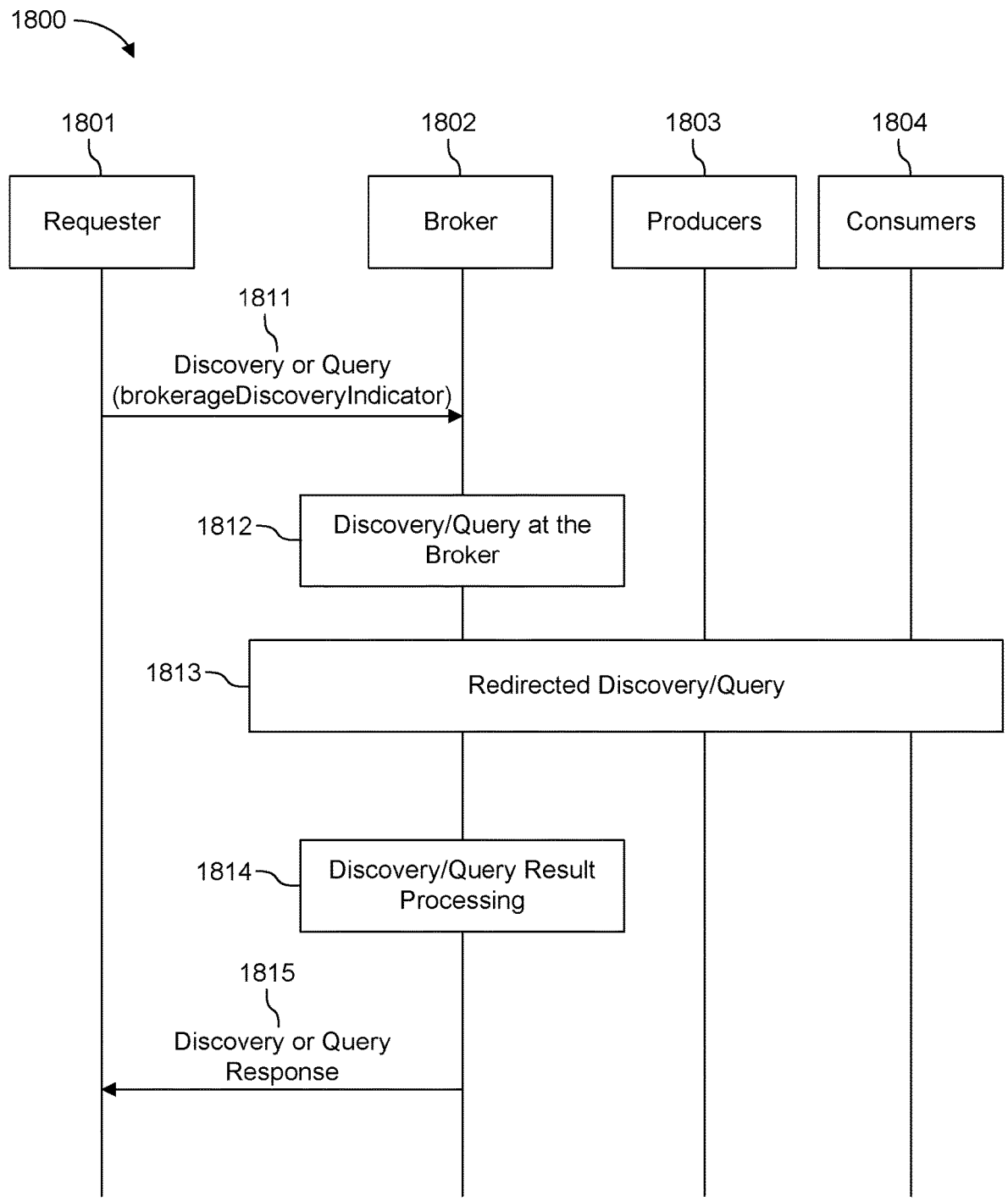
FIG. 18 is a diagram of an example procedure for discovery.

FIG. 18 is a diagram of an example procedure 1800 for discovery. In the example of FIG. 18, a broker may provide value-add services related to topics. The broker may facilitate topic discovery by enhancing regular resource discovery and query methods. Two methods employed by the Broker to provide this functionality include scoping and redirection. In the example of FIG. 18, the broker is assumed to be the host of resources other than <topic> resources as well. Therefore, the broker may be the target of any regular resource discovery or query requests. In SL implementations such as oneM2M, resource discovery requests as well as queries may be designed to be targeted to a resource in a resource tree. The receiver may use the resource tree based at the target resource to perform the discovery or query, i.e. it may include in the search the descendants of the target resource. It is assumed that <topic> resources may be stored in a dedicated tree, e.g. the <domain> resource (see Table 5). These methods may be applied, with minor changes, to other resource organization schemes.

Referring to FIG. 18, a requester 1801 may send a discovery or query request to the broker 1802 that may comprise the message parameter brokerageDiscoveryIndicator (step 1811). The broker 1802 may receive the discovery or query request and may proceed based on the value of the message target and the brokerageDiscoveryIndicator as follows:

(1) Brokerage resource target, no brokerageDiscoveryIndicator. The broker 1802 may receive a regular discovery or query request targeting a brokerage resource (e.g. <broker>, <domain>, <topic>) without the brokerageDiscoveryIndicator message parameter. In this case the broker 1802 may process the request locally (step 1812). Step 1813 may be bypassed and in step 1814, the broker 1802 may prepare the discovery or query result, which may be based on information available in all available topics within a domain or within a topic, if the request targets <broker>, <domain> or <topic> respectively. This may enable queries and discoveries based on the information maintained using the brokerage functionality. For example, a requester 1801 may be interested in discovering topics that maintain a specific number of instance history, that belong to a given topic group, etc.

(2) Brokerage resource target, brokerageDiscoveryIndicator=targetDomain. The broker 1802 may receive a regular discovery or query request targeting a brokerage resource and brokerageDiscoveryIndicator=targetDomain. In this case after the initial receipt and processing of the request (step 1812), the broker 1802 may redirect the discovery request to the other entities in the domain, i.e. its producers 1803 and consumer 1804, as shown in step 1813. After receiving the corresponding results, the broker 1802 may aggregate the responses (step 1814). This may enable discoveries and queries to be distributed to the stakeholders in a brokerage domain without the requester discovering each of these entities separately. Other variants may be implemented for brokerageDiscoveryIndicator using values targetProducers, targetConsumer, etc. to retarget to only specific stakeholders.

(3) Generic resource target, brokerageDiscoveryIndicator=includeProducedTopic. The broker 1802 may receive a regular discovery or query request targeting resources other than brokerage resources and with brokerageDiscoveryIndicator=includeProducedTopic. The broker 1802 may start with a regular discovery or query based on the message parameters as shown in step 1812 and step 1813 may be bypassed. The scope of the search may include descendants of the target resource. If a descendant resource has produces Topic attribute pointing to a <topic> resource, then the broker 1802 may add the <topic> resource to the search scope and may process the request in the enlarged scope (step 1814). This may enable discoveries and queries to produce more meaningful results. For example, a <container> resource may be produced containing traffic camera readings, with labels or semantic description containing only related terms: "intersection," "operatorY," etc. The container may be used in the use case described above to provide instances for an ability to pass a road topic, e.g. <passability123> that has labels or a semantic description including the term "FrenchQuarter." In this case, a resource discovery aimed at the regular resource tree may be able to discover the container based on the description of the topic it produces, rather than its own attributes. Similarly, a semantic query is able to use the semantic description of the topic in addition to those of the resources in the resource tree.

(4) Generic resource target, no brokerageDiscoveryIndicator. This may comprise a legacy resource discovery or query implementation. The broker may use for the search the resource tree based at the target resource, i.e. it may include in the search the descendants of the target resource. Step 1813 may be bypassed.

The broker 1802 may respond to the requester 1801 and may provide the results of the resource discovery or query (step 1815).

The broker may provide additional services by maintaining a record of the status of the liveliness of participants such as the publishers. While many consumers may be interested only in the instance values, some may be interested in these topics only if the producers are known to provide data reliably. The individual consumers may not need to each check the liveliness of the publishers separately.

The exact definition of producer liveliness, as well as the computation method and the associated parameters may vary depending on the needs of the implementation. For example, the liveliness status may assert:

That a participant can communicate, e.g. a publisher can be pinged;

That brokerage communications with a participant are active, e.g. a publisher publishes to any topic; and That a specific communication with a participant is active, e.g. a publisher publishes to a specific topic.

Each of these methods may be used to assess liveliness in a more complex way, e.g. for a group of producers or to include other participants and actions, e.g. consumers capable of receiving notifications.

Maintaining the liveliness status of a producer is a value-add service which may be provided by the broker to interested consumers. The status may be maintained within the topic for each producer, e.g. as a resource attribute that may be exposed to the subscriber. The broker may provide a "composite liveliness" parameter e.g. by maintaining an average or the longest inactive time for the participants within a group.

The broker may use a variety of mechanisms for this purpose, depending on the meaning of the liveliness parameter, for example:

(1) Keeping track of all its communications with the participant. For example, a publisher may be considered alive based on its discovery requests (not necessarily based on topic instance publication).

(2) Initiating communications with participants. For example, a broker may initiate short communications or pings with participants in order to evaluate their liveliness.

(3) Requesting participants to maintain a heartbeat. For example, the broker may require that participants provide a periodic notification in order to maintain their liveliness status.

(4) Keeping track of only specific communications with participants. For example, the broker may consider a publisher lively only if it publishes to specific topics or a subscriber only if all notifications targeting it are successful.

Maintaining a liveliness status of the participants in the system may be an important service provided by the broker. In RESTful communications, the various nodes are usually able to assess the communication status only directly, as endpoints in one-to-one communications. In systems designed for many-to-many communications, assessment of communication status may be costly for the system. In addition, the broker may be uniquely positioned to provide a more holistic assessment. For example, a sensor may provide several types of measurements at different rates. A subscriber to the slowest-changing measurement may only incorrectly assess that there are communication issues after long pauses. If all the measurements are published with the same broker, the broker may assess that the producer is "alive" functionally by monitoring the other measurements, without initiating any additional communications with the sensor. The parameters used for a liveliness assessment may be provided by livelinessPolicy for a Topic, and the status may be maintained.

A broker may provide storage and persistence services, which may be especially useful for resource constrained consumers. These consumers not only optimize their discoveries by being able to access all topic-related data in one place, they may use the topic settings (or create a topic with the desired settings) such that the data is stored and maintained on its behalf. The consumer may set persistence values that indicate how this storage is handled.

Topic creators may provide settings indicating how the data is stored and maintained using the instanceRetentionPolicy. For example, only a certain number of the latest instances may be retained, each instance may be held for a certain duration, each instance from each publisher may be held for different durations, etc. This policy may indicate also that older instances may be retained only if the publisher liveliness conditions are met, or in any case.

The broker may provide value-add by employing additional processing for the instances, using processingCriteria. For this, the broker may use algorithms provided by external services, or it may implement the processing itself. But it may allow this processing to be performed before the consumer may receive the data, which optimizes the functionality of the consumer.

The processingCriteria topic attribute may indicate if any data processing should be applied by the broker when a new instance is created. For example, it may be specified that two or more publishers provide the same content within a window in order for the content to become an instance (i.e. apply a consistency check), or that specific instance filtering (e.g. by content values, in time, etc.) are to be applied. This value-add service may not always be applied at the producers, even if computation resources are available because the instances involved may belong to different producers. For different consumers this value-add service at the broker may ensure that the processing is done uniformly across consumers and may provide the added benefit of being done once for a potentially large number of endpoints using the data.

Figure 19:
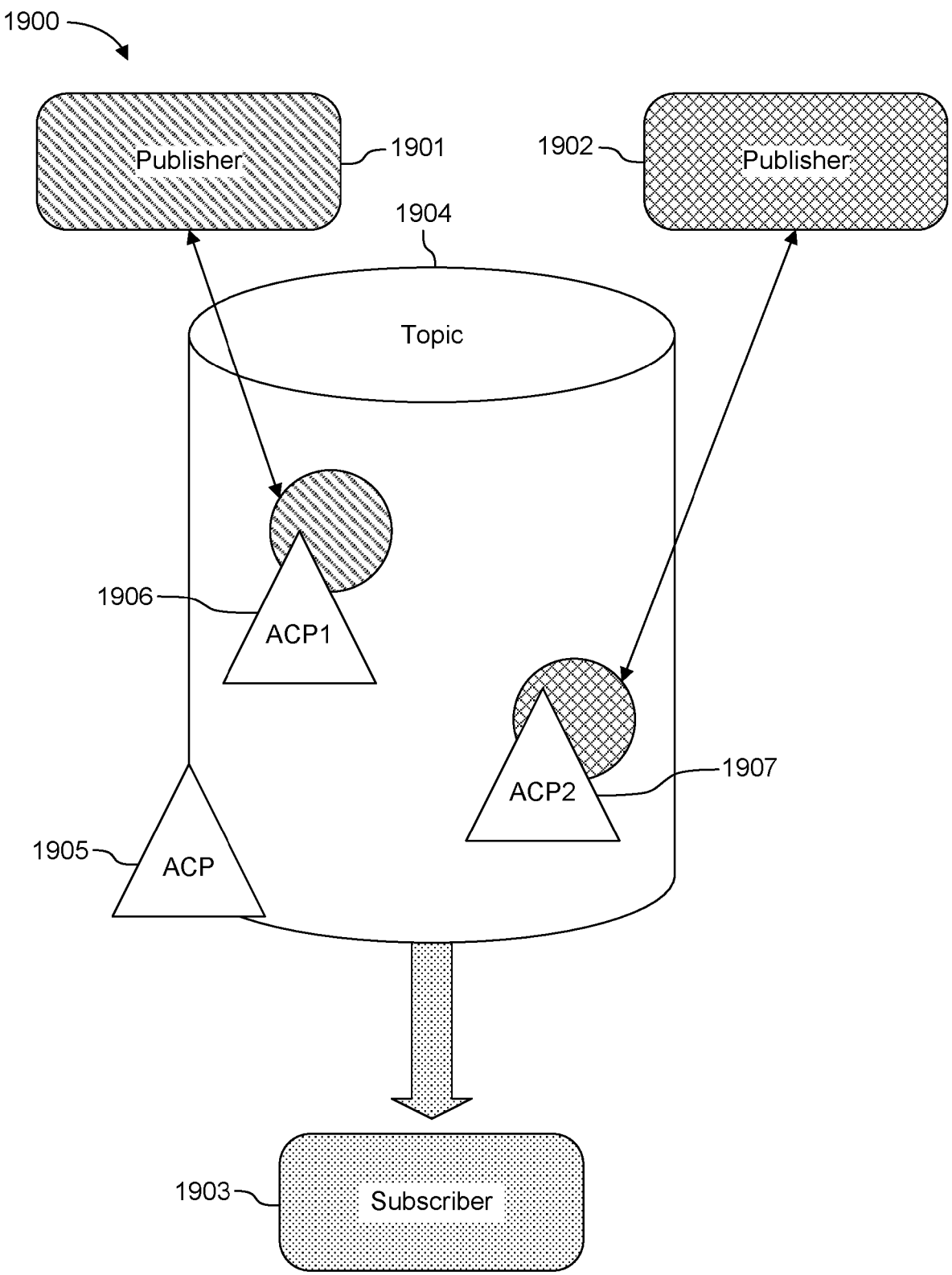
FIG. 19 is a diagram of topic Access Control Policies (ACPs)

FIG. 19 is a diagram of topic ACPs 1900. A broker may provide value add by providing topic-related security. This may alleviate the need for a consumer (e.g., subscriber 1903) to set up an ACP with each of the producers. The broker may perform the brokerage of the ACPs. ACPs of data generation the topic instances within a topic may be used by the broker and taken into account when configuring ACPs of published topics. In the example of FIG. 19, if published data to a particular topic comprises data originating from multiple sources (e.g., publisher 1901 and publisher 1902), the broker may configure the topic with ACPs that are based on the aggregated ACPs from the individual instances. The broker may generate the aggregated ACP 1905 for the topic 1904 which may comprise only privileges that are common in ACP1 1906 and ACP2 1907, i.e. across all topic instances of the topic 1904. This broker service may be used to optimize the security functionality for any topics, especially those using announcement as the creation and/or publication methods.

The broker may provide value add by implementing an arbitration system for topic publication and subscriptions. The broker may provide arbitration for data brokerage requests in order to differentiate quality of service to subscribers. On the publication side, the arbitration system may allow for the publications from different publishers to be treated differently. For this purpose, the brokerage system may use the participantPriority attribute of the publisher and/or consumer and the arbitrationProposalStrength attribute to compute an overall request strength value.

When a new topic instance is published the broker may use the participantPriority attribute of the publisher and the value of the arbitrationProposalStrength attribute in the proposed topic instance to compute the overall publication request strength. The publication procedure may then be subject to the arbitrationPolicy, in addition to all other policies, in order for the instance to be created. For example, if the arbitrationPolicy specifies a minimum overall publication request strength, publications that do not meet the criteria may not be saved as instances. In other implementations the broker may perform arbitration based on publication request strength only in cases where too many instances are received or to provide a ranking between different instances.

When a new subscription request for a topic is received, the broker may use the participantPriority attribute of the consumer and the value of the arbitrationProposalStrength attribute in the subscription received to compute the overall subscription request strength. The subscription procedure may then be subject to the arbitrationPolicy, in addition to all other policies, in order for the subscription to be created. For example, if the arbitrationPolicy specifies a minimum overall subscription request strength, subscription requests that do not meet the criteria may not be accepted. In other implementations the broker may perform arbitration based on subscription strength only in cases where too many notifications need to be processed, or to provide a quality of service differentiation between subscriptions.

The participantPriority and the arbitrationProposalStrength parameters may be implemented also as message parameters. In another implementation, the broker may be provisioned with an algorithm for calculating the strength of the requests without these explicit arbitration parameters. For example, the algorithm may assign different participant priority values to participants based on their IDs, participant location, etc. Publication requests may be assigned different arbitrationProposalStrength values based on the publisher ID, time of day, participant location, participant capabilities (e.g. measurement accuracy), etc. Subscription requests may be assigned different arbitrationProposalStrength values based on the subscriber ID, participant agreed QoS, etc.

Figure 20:
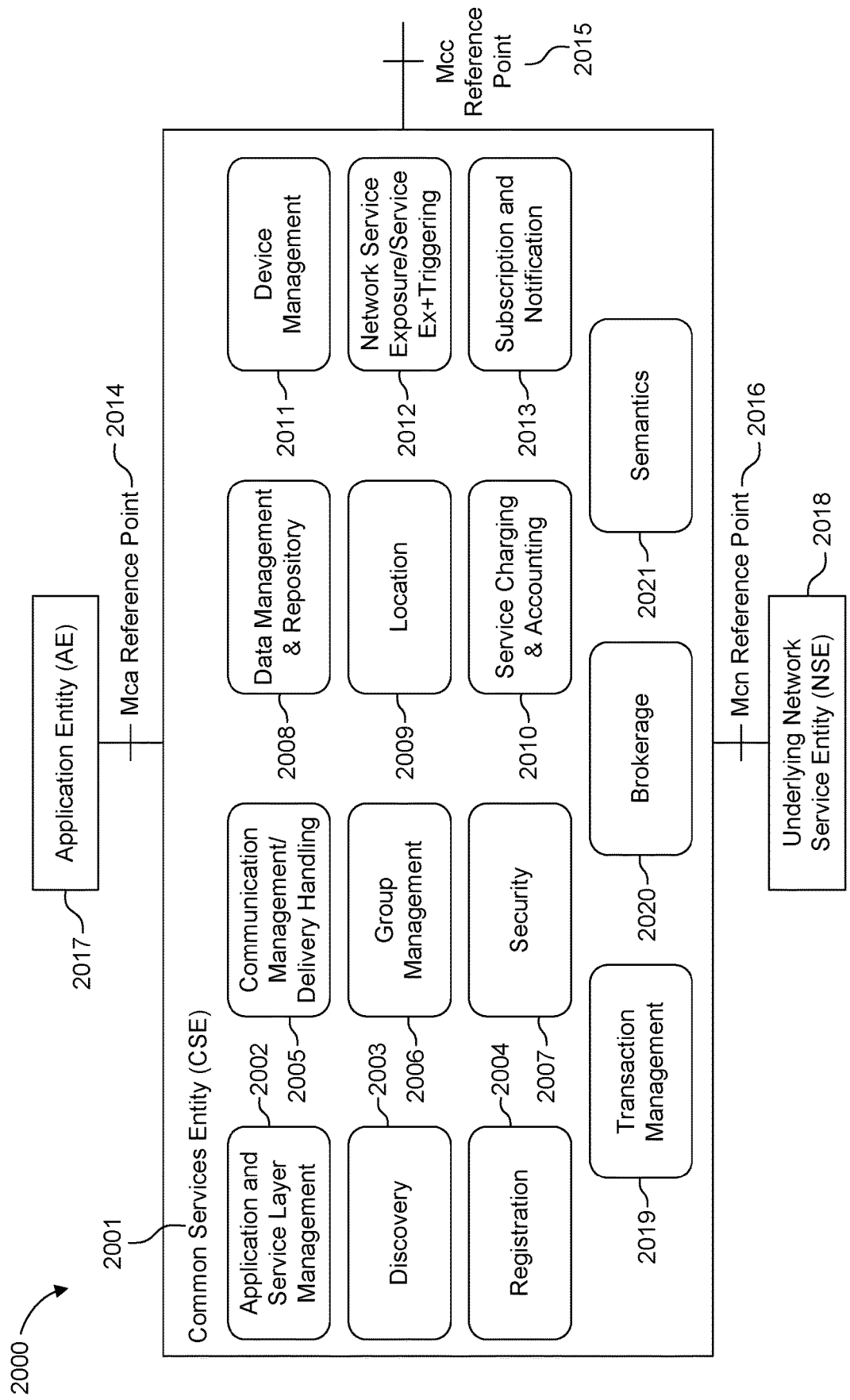
FIG. 20 is a diagram of an example oneM2M service layer that supports a data brokerage Common Service Function (CSF)

FIG. 20 is a diagram of an example oneM2M service layer that supports a data brokerage CSF 2000. In the example of FIG. 20, the CSFs may include the following: Application and service layer Management CSF 2002; Discovery CSF 2003; Registration CSF 2004; Communication Management/Delivery Handling CSF 2005; Group Management CSF 2006; Security CSF 2007; Data Management and Repository CSF 2008; Location CSF 2009; Service Charging & Accounting CSF 2010; Device Management CSF 2011; Network Service Exposure, Service Execution and Triggering CSF 2012; Subscription and Notification CSF 2013; Transaction Management CSF 2019; and Semantics CSF 2021. The example of FIG. 20 also shows a CSE 2001 to interface through the Mca reference point 2014, Mcc (and Mcc') reference point 2015, and Mcn reference point 2016 to other entities including but not limited to: an AE 2017; other CSEs; and an NSE 2018 (i.e. the underlying network).

A data brokerage function 2020 may be implemented as a CSF as shown in the example of FIG. 20. This CSF may be hosted on various types of service layer nodes, such as IoT gateways and servers, and it may provide data brokerage services using resources hosted on that CSE 2001.

In some examples, not all resources hosted on the CSE 2001 need to be included in the brokerage service at a given time. At the same time, not all the oneM2M resource types may be specified to support data brokerage. oneM2M resources especially well-suited for brokerage services may include but are not limited to: content sharing resources such as container, flexContainer and timeSeries; AEs, etc.

In a oneM2M system the Information Elements described herein may be implemented using several resources identified below, as well as enhancements of existing resources.

New resource types describing brokerage entities may be used. For example, new <broker>, <publisher >, <subscribers> resource types may be specified in oneM2M to describe and identify the various participants the system. The attributes of the new resource types correspond to those in Table 4, Table 6, and Table 7 respectively. Policy parameters corresponding to the descriptions in Table 9 may be added as attributes to these resource types, or they may be implemented as policy resources.

New resource types describing topics and domains may be used. New <topic> and <domain > resource types may be specified in oneM2M to describe and identify these concepts in the system. The attributes of the new resource types correspond to those in Table 8 and Table 5 respectively. Policy parameters corresponding to the descriptions in Table 9 may be added as attributes to these resource types, or may be implemented as policy resources.

New resource attributes may be used. In order to implement the methods using new resource attributes oneM2M may specify the following common attributes that may be present in a variety of resource types:

allow Topic: an attribute that if implemented as a Boolean, for example, it may indicate (if TRUE) that the resource may be used for the creation of a topic that may be published at a broker. It may be implemented also such that any value indicates that creation of a topic is allowed, and the value itself may be used in the creation procedure, e.g. as topicDescription value, as semanticDescription, etc.

createTopicCriteria: an attribute that may be present in a resource of type <subscription>. It may provide criteria for topics to be created based on the notifications sent as a result of the given subscription.

produces Topic: an attribute indicating the resource ID (or a list of IDs) of a topic produced using this resource.

arbitrationProposalStrength: an attribute that may be present in a variety of resource types. When contained in a subscription resource, it may indicate an arbitration proposal strength for the subscription. When contained in other resource types used to create topic instances, it may indicate an arbitration proposal strength for publication.

In order to implement the methods using new access control operations, some attributes of the oneM2M <accessControlPolicy> may be enhanced. As described above, the oneM2M <accessControlPolicy> resource may comprise privileges and selfPrivileges attributes that represent a set of access control rules defining which AEs/CSEs are allowed to perform which operation. This set of Access Control Rules may comprise 3-tuples comprising: access ControlOriginators, accessControlContext, and access ControlOperations.

The accessControlOperations parameter may be enhanced with the PUBLISH operation, as shown in Table 10 below.

TABLE 10

| New Parameters in accessControlOperations | |
|---|---|
| Name | Description |
| RETRIEVE | Privilege to retrieve the content of an addressed resource |
| CREATE | Privilege to create a child resource |
| UPDATE | Privilege to update the content of an addressed resource |
| DELETE | Privilege to delete an addressed resource |
| DISCOVER | Privilege to discover the resource |
| NOTIFY | Privilege to receive a notification |
| PUBLISH | Privilege to publish the resource |

The following new request parameters may be included in oneM2M requests:

topicIndicator: a message parameter used as follows:

When present in an announcement message targeting the broker, its value may provide the resource ID of the <topic> to which a producer volunteers to publish.

When present in a notification message, its value may provide the resource ID of the <topic> that the broker is advertising.

When present in other announcement messages with either a default or NULL value, it may indicate that the announcement is to be used for a new topic creation.

brokeragePolicy: a request message parameter that may be used to indicate policies to be used for brokerage-related functionality.

longTermDiscoveryIndicator: a parameter for discovery request messages may be used to indicate that the request is to be repeated by the receiver/broker. When present it may provide parameters for repetition, lifespan, response options, etc. For example, it may provide these parameters as an ordered list, as individual, dependent message parameters, or as the resource ID of a resource containing this information.

subscriptionIndicator: a parameter for long term discovery request messages that may also be used for topic creation. By including this parameter, the requester may indicate that it requests to become a consumer once the topic has been created.

brokerageDiscoveryIndicator a parameter for enhanced discovery request messages that may have several values. When including this parameter, the requester may provide information used by the broker for providing additional discovery-related functionality.

topicAdvertisementIndicator a request message parameter that may be used to indicate that the message is used for topic advertisement only.

The following new response parameter may be included in oneM2M response messages:

relatedTopicsIndicator: a response message parameter used to indicate topics related to the operation result.

Figure 21:
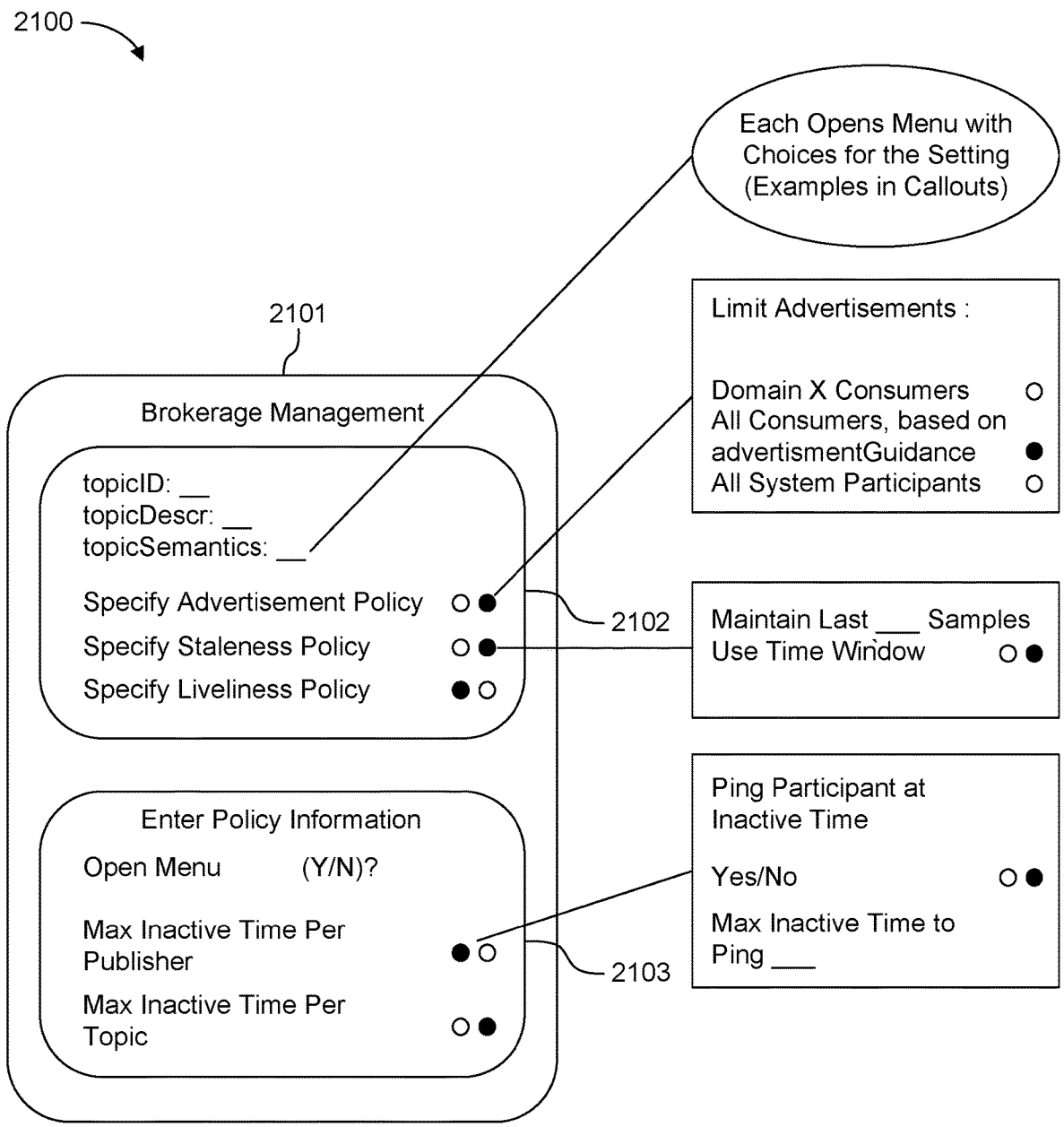
FIG. 21 is a diagram of an example graphical user interface (GUI) for brokerage management.

FIG. 21 is a diagram of an example GUI for brokerage management 2100. The GUI may comprise an application programming interface (API) for brokerage management 2101 which may be used to create topics 2102 as well as brokerage policies 2103. In this example, the API may allow providing input for parameters to be reflected in the <topic> resource, as well as for parameters which might be enforced via policies.

Figure 22A:
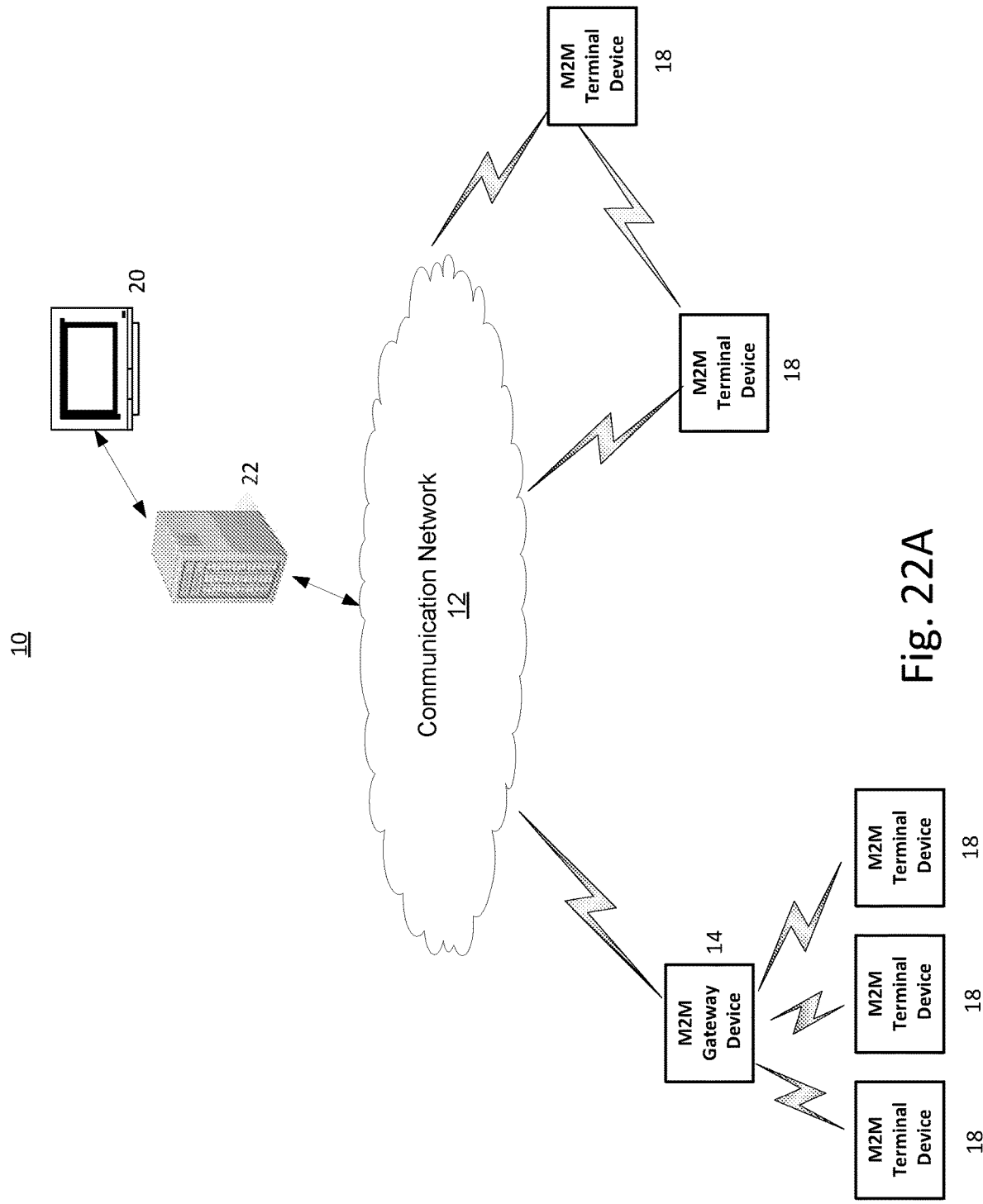
FIG. 22A is a system diagram of an example machine-to-machine (M2M) or Internet of Things (IoT) communication system in which one or more disclosed embodiments may be implemented.

FIG. 22A is a diagram of an example machine-to-machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway or M2M service platform may be a component of the IoT/WoT as well as an IoT/WoT service layer, etc. Any of the devices, functions, nodes, or networks illustrated in any of FIGS. 1 to 21 may comprise a node of a communication system such as the one illustrated in FIGS. 22A-B.

As shown in FIG. 22A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 22A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, devices, of the network. For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. A M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles personal digital assistants, health and fitness monitors, lights, thermostats, appliances, garage doors and other actuator-based devices, security devices, and smart outlets.

Figure 22B:
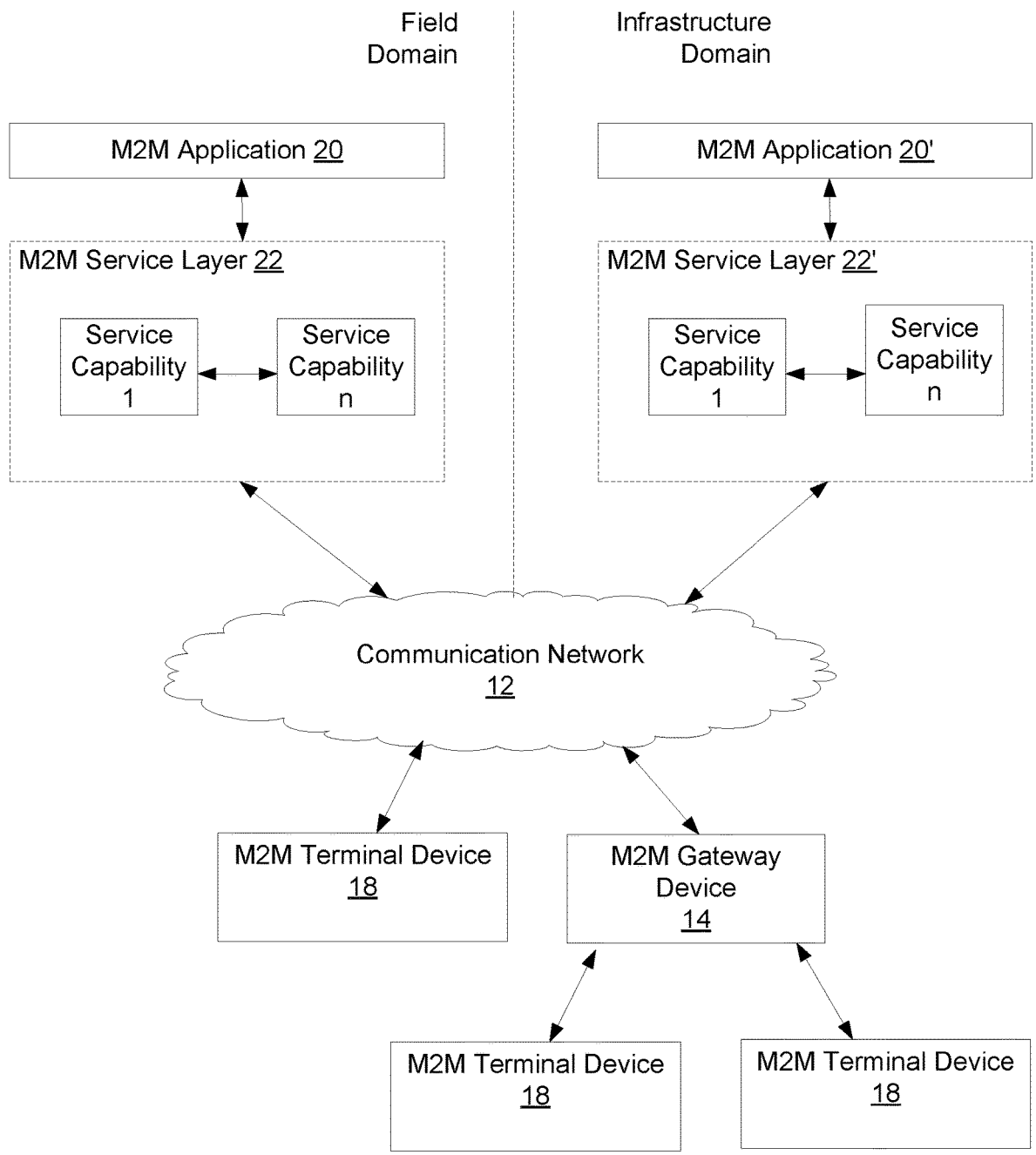
FIG. 22B is a system diagram of an example architecture that may be used within the M2M/IoT communications system illustrated in FIG. 22A.

Referring to FIG. 22B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Still referring to FIG. 22B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, a service layer (SL), such as the service layers 22 and 22' illustrated in FIGS. 22A and 22B, defines a software middleware layer that supports value-added service capabilities through a set of application programming interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented in a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device, or the like) having the general architecture illustrated in FIG. 22C or 22D described below.

Further, the methods and functionalities described herein may be implemented as part of an M2M network that uses a Service Oriented Architecture (SOA) and/or a resource-oriented architecture (ROA) to access services, such as the above-described Network and Application Management Service for example.

Figure 22C:
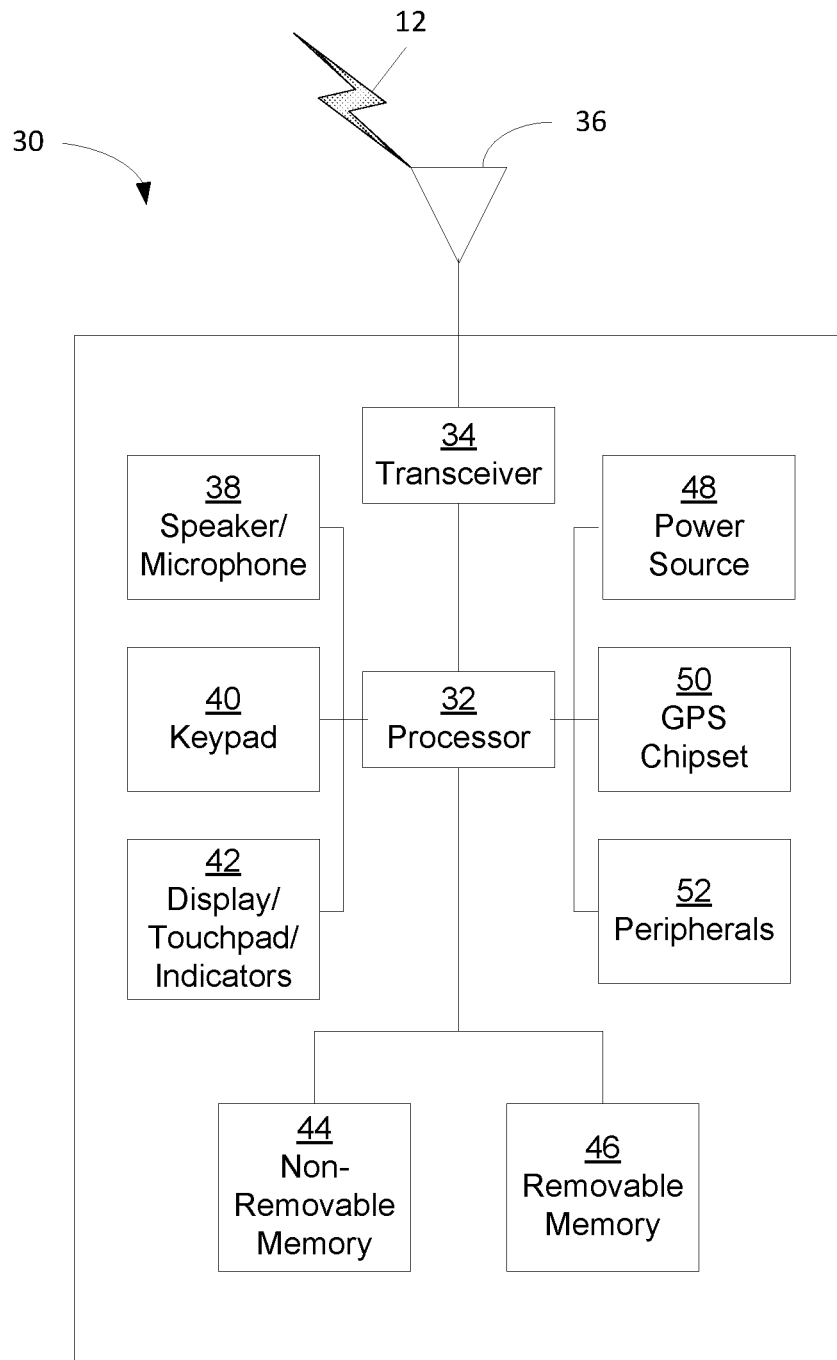
FIG. 22C is a system diagram of an example M2M/IoT terminal or gateway device that may be used within the communications system illustrated in FIG. 22A.

FIG. 22C is a block diagram of an example hardware/software architecture of a node of a network, such as one of the nodes, devices, functions, or networks illustrated in FIGS. 1 to 21, which may operate as an M2M server, gateway, device, or other node in an M2M network such as that illustrated in FIGS. 22A and 22B. As shown in FIG. 22C, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the notifications and triggers related thereto described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the node 30 to operate in a wireless environment. The processor 32 may be coupled to the transceiver 34, which may be coupled to the transmit/receive element 36. While FIG. 22C depicts the processor 32 and the transceiver 34 as separate components, it will be appreciated that the processor 32 and the transceiver 34 may be integrated together in an electronic package or chip. The processor 32 may perform application-layer pograms (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 22C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 1-9) and in the claims. While FIG. 22C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 22C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of a node or configure a node (e.g., nodes in FIGS. 1-21), and in particular underlying networks, applications, or other services in communication with the UE. The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect devices, a vibration device, a television transceiver, a hands free headset, a Bluetooth® module, a frequency modulated (FM) radio unit, a digital music player, a media player, a video game player module, an Internet browser, and the like.

Figure 22D:
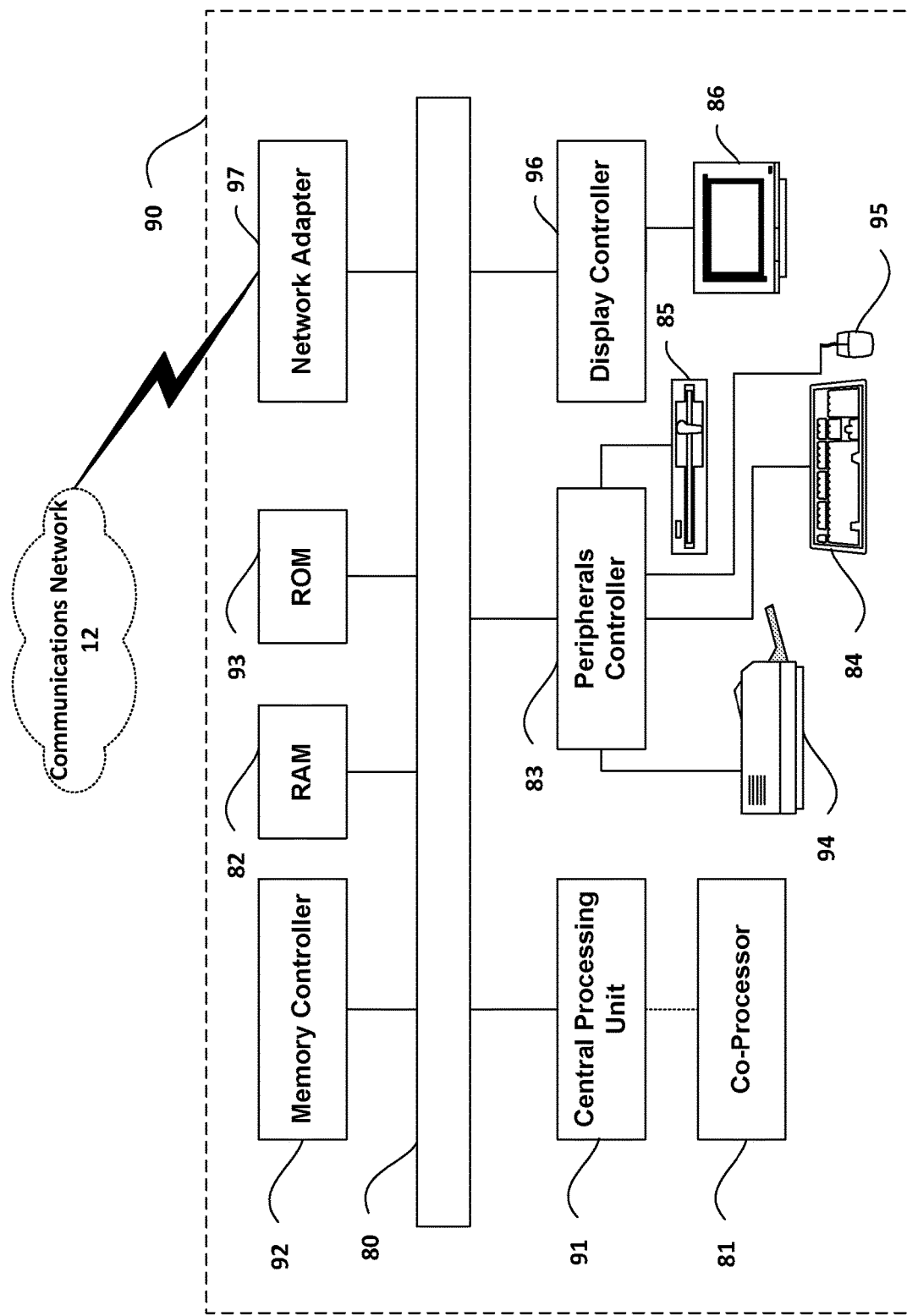
FIG. 22D is a block diagram of an example computing system in which aspects of the communication system of FIG. 22A may be embodied.

FIG. 22D is a block diagram of an exemplary computing system 90 which may also be used to implement one or more nodes of a network, such as nodes, devices, functions, or networks illustrated in FIGS. 1-21, which may operate as an M2M server, gateway, device, or other node in an M2M network such as that illustrated in FIGS. 22A and 22B. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for security protection.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97 that may be used to connect computing system 90 to an external communications network, such as network 10 of FIG. 22A and FIG. 22B, to enable the computing system 90 to communicate with other nodes of the network. The communication circuitry, alone or in combination with the CPU 91, may be used to perform the transmitting and receiving steps described herein (e.g., in FIGS. 1-21) and in the claims.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed is:

1. An apparatus comprising a processor, a memory, and communication circuitry, the apparatus being connected to a network via its communication circuitry, the apparatus further comprising a service layer entity with computer-executable instructions stored in the memory of the apparatus which, when executed by the processor of the apparatus, cause the apparatus to perform operations comprising:

receiving, at the service layer entity, from a first entity, a first signal indicating a publishing intent associated with a topic indicator;

determining, based on one or more policies and consumer interest information, one or more consumers interested in messaging associated with the topic indicator;

sending, based on the determined one or more consumers interested in the messaging, advertisement information for a topic associated with the topic indicator;

receiving, based on the advertisement information and from a second entity hosted on a second apparatus, a subscription request associated with the topic indicator;

generating, based on the publishing intent and the subscription request, a topic instance; and sending, to the second entity, based on the received subscription request, at least one second signal comprising one or more notifications and one or more publish instances associated with the generated topic instance, wherein each publish instance of the one or more publish instances is associated with a value indicative of a priority relative to one or more publishers.

2. The apparatus of claim 1, wherein the apparatus hosts the first entity.

3. The apparatus of claim 1, wherein the first entity comprises an application layer entity.

4. The apparatus of claim 1, wherein the second entity comprises a service layer entity hosted on an Internet of Things (IOT) device.

5. The apparatus of claim 1, further comprising computer-executable instructions stored in the memory of the apparatus which, when executed by the processor of the apparatus, cause the apparatus to perform further operations comprising:

arbitrating scope of advertising or message delivery based on at least one of: a policy of the one or more policies, an identifier associated with the apparatus, a location associated with the apparatus, a capability associated with the apparatus, or a time of day.

6. The apparatus of claim 1, further comprising computer-executable instructions stored in the memory of the apparatus which, when executed by the processor of the apparatus, cause the apparatus to perform further operations comprising:

arbitrating the subscription request based on at least one of: an identifier associated with the second apparatus or a quality of service (QOS).

7. The apparatus of claim 1, wherein the at least one second signal is sent based on an access control policy (ACP).

8. The apparatus of claim 1, further comprising computer-executable instructions stored in the memory of the apparatus which, when executed by the processor of the apparatus, cause the apparatus to perform further operations comprising:

redirecting the subscription request to the second entity.

9. The apparatus of claim 8, wherein the second entity is a service layer entity.

10. The apparatus of claim 1, wherein the subscription request is to be repeated and managed by the apparatus.

11. The apparatus of claim 10, further comprising computer-executable instructions stored in the memory of the apparatus which, when executed by the processor of the apparatus, cause the apparatus to perform further operations comprising:

sending, to the second apparatus, the at least one second signal based on an update to the generated topic instance.

12. The apparatus of claim 11, wherein the update is based on data associated with the generated topic instance exceeding a predetermined threshold.

13. The apparatus of claim 1, wherein the topic indicator comprises an identifier of a collection of data objects that are related to each other.

14. The apparatus of claim 1, wherein the topic indicator comprises an identifier characterizing signaling messages related to each other.

15. The apparatus of claim 1, further comprising computer-executable instructions stored in the memory of the apparatus which, when executed by the processor of the apparatus, cause the apparatus to perform further operations comprising:

sending a third signal comprising an announcement message indicating:
the publishing intent and a message topic, or
the generated topic instance.

16. The apparatus of claim 1, further comprising computer-executable instructions stored in the memory of the apparatus which, when executed by the processor of the apparatus, cause the apparatus to perform further operations comprising:

determining a status of the third apparatus based on at least one of a heartbeat message or a time duration since an update to the generated topic instance.

17. The apparatus of claim 1, wherein the second entity comprises an application layer entity.

18. A method for use in an apparatus, the method comprising:

receiving, at a service layer entity, from a first entity, a first signal indicating a publishing intent associated with a topic indicator;

determining, based on one or more and consumer interest information, one or more consumers interested in messaging associated with the topic indicator;

sending, based on the determined one or more consumers interested in the messaging, advertisement information for a topic associated with the topic indicator;

receiving, based on the advertisement information and from a second entity hosted on a second apparatus, a subscription request associated with the topic indicator;

generating, based on the publishing intent and the subscription request, a topic instance; and sending, to the second entity, based on the received subscription request, at least one second signal comprising one or more notifications and one or more publish instances associated with the generated topic instance, wherein each publish instance of the one or more publish instances is associated with a value indicative of a priority relative to one or more publishers.

* * * * *